United States Patent
Sibtain et al.

(10) Patent No.: US 10,000,630 B2
(45) Date of Patent: Jun. 19, 2018

(54) ETHYLENE INTERPOLYMERS HAVING IMPROVED COLOR

(71) Applicant: NOVA Chemicals (International) S.A., Fribourg (CH)

(72) Inventors: Fazle Sibtain, Calgary (CA); Christopher John Brooke Dobbin, Calgary (CA); Kenneth Edward Taylor, Sarnia (CA); Hamidreza Khakdaman, Calgary (CA); P Scott Chisholm, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 338 days.

(21) Appl. No.: 14/918,719

(22) Filed: Oct. 21, 2015

(65) Prior Publication Data

US 2016/0108222 A1    Apr. 21, 2016

(30) Foreign Application Priority Data

Oct. 21, 2014  (CA) .................................... 2868640

(51) Int. Cl.
*C08L 23/08* (2006.01)
*C08J 5/18* (2006.01)
(Continued)

(52) U.S. Cl.
CPC .......... *C08L 23/0815* (2013.01); *B29C 41/04* (2013.01); *B32B 3/266* (2013.01);
(Continued)

(58) Field of Classification Search
CPC .......... C08L 23/04; C08L 23/06; C08L 23/08; C08L 23/0815; C08L 2205/025;
(Continued)

(56) References Cited

U.S. PATENT DOCUMENTS

| | | |
|---|---|---|
| 5,382,630 A | 1/1995 | Stehling et al. |
| 5,382,631 A | 1/1995 | Stehling et al. |

(Continued)

FOREIGN PATENT DOCUMENTS

| | | |
|---|---|---|
| EP | 0 770 629 A2 | 5/1997 |
| EP | 0 733 653 B1 | 11/1998 |

(Continued)

OTHER PUBLICATIONS

Wild, L.; Ryle, T. R.; Knobelock, D. C and Peat, I. R.; Determination of Branching Distributions in Polyethylene and Ethylene Corpolymers; Journal of Polymer Science: Polymer Physics Edition, vol. 20, (1982); pp. 441-455.

(Continued)

*Primary Examiner* — Roberto Rabago
(74) *Attorney, Agent, or Firm* — Lawrence T. Kale

(57) ABSTRACT

This disclosure relates to a continuous solution polymerization process where ethylene interpolymer products having an improved color index; for example, products having higher whiteness (Whiteness Index (WI)) and lower yellowness (Yellowness Index (YI)). Product color was improved by adjusting selected solution polymerization reaction conditions. The disclosed ethylene interpolymer products have improved color relative to comparative polyethylene compositions.

12 Claims, 7 Drawing Sheets

(51) Int. Cl.
    *C08F 210/16* (2006.01)
    *C08J 5/00* (2006.01)
    *C08F 2/00* (2006.01)
    *B32B 3/26* (2006.01)
    *B32B 27/32* (2006.01)
    *C08L 23/20* (2006.01)
    *B29C 41/04* (2006.01)
    *B32B 7/12* (2006.01)
    *B32B 27/08* (2006.01)
    *B32B 27/34* (2006.01)
    *B29K 23/00* (2006.01)
    *B29K 105/00* (2006.01)
    *C08F 4/659* (2006.01)
    *C08F 4/6592* (2006.01)

(52) U.S. Cl.
    CPC ............ *B32B 7/12* (2013.01); *B32B 27/08* (2013.01); *B32B 27/327* (2013.01); *B32B 27/34* (2013.01); *C08F 2/001* (2013.01); *C08F 210/16* (2013.01); *C08J 5/00* (2013.01); *C08J 5/18* (2013.01); *C08L 23/20* (2013.01); *B29K 2023/08* (2013.01); *B29K 2105/0058* (2013.01); *B29K 2105/0085* (2013.01); *B29K 2105/0094* (2013.01); *B29K 2905/02* (2013.01); *B29K 2995/0063* (2013.01); *B29K 2995/0088* (2013.01); *B32B 2307/7265* (2013.01); *B32B 2439/40* (2013.01); *C08F 4/6592* (2013.01); *C08F 4/65908* (2013.01); *C08F 4/65912* (2013.01); *C08F 2420/04* (2013.01); *C08F 2500/12* (2013.01); *C08F 2500/18* (2013.01); *C08J 2323/06* (2013.01); *C08J 2323/08* (2013.01); *C08J 2323/20* (2013.01); *C08J 2323/24* (2013.01); *C08J 2423/08* (2013.01); *C08J 2423/20* (2013.01); *C08J 2423/24* (2013.01); *C08L 2203/16* (2013.01); *C08L 2205/025* (2013.01); *C08L 2205/03* (2013.01); *C08L 2205/06* (2013.01); *C08L 2314/02* (2013.01); *C08L 2314/06* (2013.01)

(58) Field of Classification Search
    CPC ............ C08L 2205/03; C08L 2314/02; C08L 2314/06; C08F 210/16; C08F 2/001; C08J 2323/06; C08J 2323/08; C08J 5/18
    See application file for complete search history.

(56) References Cited

U.S. PATENT DOCUMENTS

| | | | |
|---|---|---|---|
| 5,408,004 A | 4/1995 | Lai et al. | |
| 5,519,091 A | 5/1996 | Tsutsui et al. | |
| 5,530,065 A | 6/1996 | Farley et al. | |
| 5,605,969 A | 2/1997 | Tsutsui et al. | |
| 5,674,342 A | 10/1997 | Obijeski et al. | |
| 5,677,383 A | 10/1997 | Chum et al. | |
| 5,685,128 A | 11/1997 | Chum et al. | |
| 5,747,594 A | 5/1998 | deGroot et al. | |
| 5,773,106 A | 6/1998 | deGroot et al. | |
| 5,783,638 A | 7/1998 | Lai et al. | |
| 5,792,534 A | 8/1998 | deGroot et al. | |
| 5,844,045 A | 12/1998 | Kolthammer et al. | |
| 5,847,053 A | 12/1998 | Chum et al. | |
| 5,869,575 A | 2/1999 | Kolthammer et al. | |
| 5,874,139 A | 2/1999 | Bosiers et al. | |
| 5,986,028 A | 11/1999 | Lai et al. | |
| 6,025,448 A | 2/2000 | Swindoll et al. | |
| 6,111,023 A | 8/2000 | Chum et al. | |
| 6,127,484 A * | 10/2000 | Cribbs ............... C08L 23/04 525/191 |
| 6,136,924 A | 10/2000 | Promel | |
| 6,218,472 B1 | 4/2001 | Debras et al. | |
| 6,221,982 B1 | 4/2001 | Debras et al. | |
| 6,262,195 B1 | 7/2001 | Dall'Occo et al. | |
| 6,306,969 B1 | 10/2001 | Patel et al. | |
| 6,316,549 B1 | 11/2001 | Chum et al. | |
| 6,346,575 B1 | 2/2002 | Debras et al. | |
| 6,388,017 B1 | 5/2002 | McDaniel et al. | |
| 6,403,717 B1 | 6/2002 | Adams et al. | |
| 6,416,833 B1 | 7/2002 | Climenhage et al. | |
| 6,433,095 B1 | 8/2002 | Laurent | |
| 6,441,116 B1 | 8/2002 | Shikuma et al. | |
| 6,448,341 B1 | 9/2002 | Kolthammer et al. | |
| 6,462,135 B1 | 10/2002 | Rohde et al. | |
| 6,462,136 B1 | 10/2002 | Saito et al. | |
| 6,469,103 B1 | 10/2002 | Jain et al. | |
| 6,479,589 B2 | 11/2002 | Debras et al. | |
| 6,479,609 B1 | 11/2002 | Dall'Occo et al. | |
| 6,489,427 B1 | 12/2002 | Clutton et al. | |
| 6,506,867 B1 | 1/2003 | Lai et al. | |
| 6,534,612 B1 | 3/2003 | Lai et al. | |
| 6,538,070 B1 | 3/2003 | Cardwell et al. | |
| 6,555,631 B1 | 4/2003 | Wang et al. | |
| 6,566,446 B1 | 5/2003 | Parikh et al. | |
| 6,566,450 B2 | 5/2003 | Dabras et al. | |
| 6,569,948 B2 | 5/2003 | Laurent | |
| 6,579,922 B2 | 6/2003 | Laurent | |
| 6,657,026 B1 | 12/2003 | Kimberley et al. | |
| 6,683,149 B2 | 1/2004 | Jain et al. | |
| 6,723,398 B1 | 4/2004 | Chum et al. | |
| 6,730,751 B2 | 5/2004 | Shamshoum et al. | |
| 6,780,954 B2 | 8/2004 | Lai et al. | |
| 6,828,395 B1 | 12/2004 | Ehrman et al. | |
| 6,844,398 B2 | 1/2005 | Shikuma et al. | |
| 6,875,816 B2 | 4/2005 | DeGroot et al. | |
| 6,906,141 B2 | 6/2005 | Chum et al. | |
| 6,908,968 B2 | 6/2005 | Jain et al. | |
| 6,916,883 B2 | 7/2005 | Parikh et al. | |
| 6,921,795 B2 | 7/2005 | Wang et al. | |
| 6,921,799 B1 | 7/2005 | Follestad et al. | |
| 6,924,342 B2 | 8/2005 | Stevens et al. | |
| 6,969,741 B2 | 11/2005 | Lustiger et al. | |
| 6,988,022 B2 | 1/2006 | Parrish et al. | |
| 7,022,770 B2 | 4/2006 | Lustiger et al. | |
| 7,101,939 B2 | 9/2006 | Nowlin et al. | |
| 7,125,933 B2 | 10/2006 | German et al. | |
| 7,148,304 B2 | 12/2006 | Kimberley et al. | |
| 7,153,909 B2 | 12/2006 | Van Dun et al. | |
| 7,166,676 B2 | 1/2007 | Jacobsen et al. | |
| 7,230,054 B2 | 6/2007 | Mavridis et al. | |
| 7,250,473 B2 | 7/2007 | Schramm et al. | |
| 7,250,474 B2 | 7/2007 | Maziers | |
| 7,271,221 B2 | 9/2007 | Stevens et al. | |
| 7,300,983 B2 | 11/2007 | Degroot et al. | |
| 7,432,328 B2 | 10/2008 | Jaker | |
| 7,439,306 B2 | 10/2008 | Davis | |
| 7,514,504 B2 | 4/2009 | Van Sinoy et al. | |
| 7,645,835 B2 | 1/2010 | Van Dun et al. | |
| 7,659,343 B2 | 2/2010 | Wooster et al. | |
| 7,714,073 B2 | 5/2010 | Jacobsen et al. | |
| 7,846,552 B2 | 12/2010 | Weeks | |
| 7,858,702 B2 | 12/2010 | Jaker | |
| 7,868,092 B2 | 1/2011 | Kwalk et al. | |
| 7,906,451 B2 | 3/2011 | Citron et al. | |
| 7,977,268 B2 | 7/2011 | Citron et al. | |
| 7,999,039 B2 | 8/2011 | DeGroot et al. | |
| 8,039,554 B2 | 10/2011 | Iseki et al. | |
| 8,076,428 B2 | 12/2011 | Shim et al. | |
| 8,101,685 B2 | 1/2012 | Jiang et al. | |
| 8,101,687 B2 | 1/2012 | Schramm et al. | |
| 8,410,217 B2 | 4/2013 | Tse et al. | |
| 8,426,525 B2 | 4/2013 | Nozue et al. | |
| 8,475,898 B2 | 7/2013 | Wang et al. | |
| 2002/0177677 A1 | 11/2002 | Kanamori et al. | |
| 2003/0088021 A1* | 5/2003 | Van Dun ............... C07F 17/00 525/53 |
| 2003/0114595 A1 | 6/2003 | Van Dun et al. | |
| 2003/0149181 A1 | 8/2003 | Kolthammer et al. | |
| 2005/0119413 A1 | 6/2005 | Maziers | |

(56) References Cited

U.S. PATENT DOCUMENTS

| | | |
|---|---|---|
| 2006/0036041 A1 | 2/2006 | Kwalk |
| 2007/0010626 A1 | 1/2007 | Shankernarayanan et al. |
| 2009/0062463 A1 | 3/2009 | Backmann et al. |
| 2009/0099315 A1 | 4/2009 | Kipke et al. |
| 2010/0304052 A1 | 12/2010 | Chai et al. |
| 2012/0065335 A1 | 3/2012 | Kipke et al. |
| 2012/0252989 A1 | 10/2012 | Dewachter et al. |
| 2012/0309910 A1 | 12/2012 | Dewachter et al. |
| 2013/0085231 A1 | 4/2013 | Lue et al. |

FOREIGN PATENT DOCUMENTS

| | | |
|---|---|---|
| EP | 0 989 140 A1 | 3/2000 |
| EP | 0 905 153 B1 | 3/2004 |
| EP | 1 961 777 A1 | 8/2008 |
| WO | 94/26816 A1 | 11/1994 |
| WO | 98/21276 A1 | 5/1998 |
| WO | 98/26000 A1 | 6/1998 |
| WO | 99/33913 A1 | 7/1999 |
| WO | 00/14129 A1 | 3/2000 |
| WO | 01/05852 A1 | 1/2001 |
| WO | 2006/045550 A1 | 5/2006 |
| WO | 2007/045415 A1 | 4/2007 |
| WO | 2009/040139 A1 | 4/2009 |
| WO | 2011/092266 A1 | 8/2011 |
| WO | 2012/004422 A1 | 1/2012 |
| WO | 2012/112259 A2 | 8/2012 |
| WO | 2012/119954 A1 | 9/2012 |
| WO | 2012/119956 A1 | 9/2012 |
| WO | 2012/133717 A1 | 10/2012 |
| WO | 2013/009514 A1 | 1/2013 |

OTHER PUBLICATIONS

ASTM E313-10; Standard Practice for Calculating Yellowness and Whiteness Indices from Instrumentally Measured Color Coordinates; ASTM International; pp. 1-6.

ASTM D1238-10; Standard Test Method for Melt Flow Rates of Thermoplastics by Extrusion Plastometer; ASTM International; pp. 1-15.

ASTM D792-13; Standard Test Methods for Density and Specific Gravity (Relative Density) of Plastics by Displacement; ASTM International; pp. 1-6.

ASTM D6474-12; Standard Test Method for Determining Molecular Weight Distribution and Molecular Weight Averages of Polyolefins by High Temperature Gel Permeation Chromatography; ASTM International; pp. 1-6.

* cited by examiner

ETHYLENE INTERPOLYMERS HAVING IMPROVED COLOR

FIELD

This disclosure relates to a continuous solution polymerization process utilizing at least two reactors employing at least one single-site catalyst formulation and at least one heterogeneous catalyst formulation to produce ethylene interpolymers having an improved color index, e.g., improved Whiteness Index (WI) and improved Yellowness Index (YI).

BACKGROUND

Solution polymerization processes are typically carried out at temperatures that are above the melting point of the ethylene interpolymer produced. In a typical solution polymerization process, catalyst components, solvent, monomers and hydrogen are fed under pressure to one or more reactors.

For ethylene homo polymerization, or ethylene copolymerization, reactor temperatures can range from about 80° C. to about 300° C. while pressures generally range from about 3 MPag to about 45 MPag and the ethylene interpolymer produced is dissolved in a solvent. The residence time of the solvent in the reactor is relatively short, for example, from about 1 second to about 20 minutes. The solution process can be operated under a wide range of process conditions that allow the production of a wide variety of ethylene interpolymers. Post reactor, the polymerization reaction is quenched to prevent further polymerization, by adding a catalyst deactivator, and passivated, by adding an acid scavenger. Once passivated, the polymer solution is forwarded to a polymer recovery operation where the ethylene interpolymer is separated from process solvent, unreacted residual ethylene and unreacted optional α-olefin(s).

There is a need to improve the color index of ethylene interpolymer products. The color index of an ethylene interpolymer product is an important attribute; frequently color is often a customer's first impression of product quality, thus it is essential that the color of an ethylene interpolymer meets the customer's expectation. In this disclosure the color index of ethylene interpolymer products was measured according to ASTM E313-10 and quantified using the Whiteness Index (WI) and the Yellowness Index (YI). WI and YI provide numbers that correlate with visual ratings of whiteness and yellowness of samples viewed in daylight by an observer having normal color vision. In this disclosure the WI of ethylene interpolymer ranged from about 10 to about 65; higher WI's are preferred by customers, i.e. more white. The YI of ethylene interpolymer ranged from about 15 to about −4; lower YI's are preferred by customers, i.e., less yellow.

SUMMARY OF DISCLOSURE

One embodiment of a continuous solution polymerization process comprises at least two reactors arranged in a series configuration. Specifically, a continuous solution polymerization process to provide an ethylene interpolymer product having improved color comprising: i) selecting a desired color index value; ii) preparing a single site catalyst formulation in a first catalyst solution having a first catalyst solution temperature (CST-1); iii) adjusting CST-1; iv) injecting the first catalyst solution, ethylene, a process solvent, optionally one or more α-olefins and optionally hydrogen into a first reactor to produce a first exit stream containing a first ethylene interpolymer in process solvent; v) preparing a first heterogeneous catalyst formulation in a second catalyst solution having a second catalyst solution temperature (CST-2); vi) adjusting CST-2; vii) passing the first exit stream into a second reactor and injecting into the second reactor, the second catalyst solution, ethylene, process solvent, optionally one or more α-olefins and optionally hydrogen to produce a second exit stream containing a second ethylene interpolymer and the first ethylene interpolymer in process solvent; viii) optionally preparing a second heterogeneous catalyst formulation in a third catalyst solution having a third catalyst solution temperature (CST-3); ix) optionally adjusting CST-3; x) passing the second exit stream into a third reactor and optionally injecting into the third reactor, the third catalyst solution, ethylene, process solvent, one or more α-olefins and hydrogen to produce a third exit stream containing an optional third ethylene interpolymer, the second ethylene interpolymer and the first ethylene interpolymer in said process solvent; xi) phase separating the third exit stream to recover an ethylene interpolymer product comprising the first ethylene interpolymer, the second ethylene interpolymer and optionally the third ethylene interpolymer, and; xii) measuring an observed color index value of the ethylene interpolymer product and adjusting CST-1 and CST-2 and optionally CST-3 to attain the desired color index value.

Another embodiment of a continuous solution polymerization process comprises at least two reactors arranged in a parallel configuration. Specifically, a continuous solution polymerization process to provide an ethylene interpolymer product having improved color comprising: i) selecting a desired color index value; ii) preparing a single site catalyst formulation in a first catalyst solution having a first catalyst solution temperature (CST-1); iii) adjusting CST-1; iv) injecting the first catalyst solution, ethylene, a process solvent, optionally one or more α-olefins and optionally hydrogen into a first reactor to produce a first exit stream containing a first ethylene interpolymer in process solvent; v) preparing a first heterogeneous catalyst formulation in a second catalyst solution having a second catalyst solution temperature (CST-2); vi) adjusting CST-2; vii) injecting said second catalyst solution, ethylene, process solvent, optionally one or more α-olefins and optionally hydrogen into a second reactor to produce a second exit stream containing a second ethylene interpolymer in process solvent; viii) combining said first and said second exit streams to form a third exit stream; ix) optionally preparing a second heterogeneous catalyst formulation in a third catalyst solution having a third catalyst solution temperature (CST-3); x) optionally adjusting CST-3; xi) passing the third exit stream into a third reactor and optionally injecting into the third reactor, the third catalyst solution, ethylene, process solvent, one or more α-olefins, hydrogen to produce a fourth exit stream containing an optional third ethylene interpolymer, the second ethylene interpolymer and the first ethylene interpolymer in process solvent; xii) phase separating the fourth exit stream to recover an ethylene interpolymer product comprising the first ethylene interpolymer, the second ethylene interpolymer and optionally the third ethylene interpolymer, and; xiii) measuring an observed color index value of the ethylene interpolymer product and adjusting CST-1 and CST-2 and optionally CST-3 to attain the desired color index value.

In the series or parallel continuous solution processes described above, one non-limiting example of a desired color index is the Yellowness Index (YI), and; in both of these processes the CST-1 may be adjusted between about 30° C. and about 10° C. and the CST-2 may be adjusted between about 35° C. and about 20° C. to produce an ethylene interpolymer product having a Yellowness Index (YI) that is decreased (improved) from about 5% to about 250%. A further non-limiting example of a desired color index is the Whiteness Index (WI) and in both the series or the parallel solution process CST-1 may be adjusted between about 30° C. and about 10° C. and the CST-2 may be adjusted between about 35° C. and about 20° C. producing an ethylene interpolymer product having a Whiteness Index (WI) increased (improved) from about 5% to 20%.

Further embodiments include a series or a parallel continuous solution process further comprising: a) optionally adding a catalyst deactivator A to the second exit stream, downstream of the second reactor, forming a deactivated solution A; b) adding a catalyst deactivator B to the third exit stream, downstream of the third reactor, forming a deactivated solution B; with the proviso that step b) is skipped if catalyst deactivator A is added in step a), and; c) phase separating deactivated solution A or B to recover the ethylene interpolymer product. Non-limiting embodiments of the catalyst deactivator include carboxylic acids; e.g., $RCO_2H$, where R is a linear or branched hydrocarbyl group having from 5 to 20 carbon atoms.

Other embodiments include series or dual parallel dual reactor solution processes comprising: a) adding a passivator to the deactivated solution A or B forming a passivated solution, and; b) phase separating the passivated solution to recover the ethylene interpolymer product.

In this disclosure the heterogeneous catalyst formulations employed may be an in-line Ziegler-Natta catalyst formation and/or a batch Ziegler-Natta catalyst formulation. More specifically, a series or parallel solution process, where the first heterogeneous catalyst formulation is a first in-line Ziegler-Natta catalyst formulation or a first batch Ziegler-Natta catalyst formulation, and; optionally the second heterogeneous catalyst formulation is a second in-line Ziegler-Natty catalyst formulation or a second batch Ziegler-Natta catalyst formulation.

Embodiments include solution process where the first, second and third reactors operate at temperatures from about 80° C. to about 300° C. and pressures from about 3 MPag to about 45 MPag.

Other embodiments include both series and parallel solution processes where the optional α-olefin is one or more $C_3$ to $C_{10}$ α-olefins. Further embodiments of the optional α-olefin include: 1-hexene, 1-octene or a mixture of 1-hexene and 1-octene.

Embodiments of this disclosure also include compositions. Specifically, an ethylene interpolymer product comprising: greater than 2.5 ppm of a first total catalytic metal and having a desired color index that is improved relative to a polyethylene composition having less than 2.5 ppm of a second total catalytic metal.

An embodiment of a desired color index is the Yellowness Index (YI). Further, embodiments of the ethylene interpolymer product may have a Yellowness Index (YI) improved (reduced) from −5 to −150% relative to comparative polyethylene composition. A further embodiment of a desired color index is the Whiteness Index (WI). Embodiments of the ethylene interpolymer product may have a Whiteness Index (WI) improved (increased) from 5 to 65% relative to comparative polyethylene composition.

Ethylene interpolymer product embodiments of this disclosure further comprises; a melt index from about 0.3 dg/minute to about 500 dg/minute and a density from about 0.869 g/cm³ to about 0.975 g/cm³; wherein melt index is measured according to ASTM D1238 (2.16 kg load and 190° C.) and density is measured according to ASTM D792. Ethylene interpolymer product embodiments may have a $M_w/M_n$ from about 2 to about 25 and a $CDBI_{50}$ from about 20% to about 97%. Embodiments include ethylene interpolymer products comprising: (i) from about 15 weight percent to about 60 weight percent of a first ethylene interpolymer having a melt index from about 0.01 dg/minute to about 200 dg/minute and a density from about 0.855 g/cm³ to about 0.975 g/cm³; (ii) from about 30 weight percent to about 85 weight percent of a second ethylene interpolymer having a melt index from about 0.3 dg/minute to about 1000 dg/minute and a density from about 0.89 g/cm³ to about 0.975 g/cm³; (iii) optionally from about 0 weight percent to about 30 weight percent of a third ethylene interpolymer having a melt index from about 0.5 dg/minute to about 2000 dg/minute and a density from about 0.89 g/cm³ to about 0.975 g/cm³; where weight percent is the weight of the first, or the second, or the third ethylene polymer divided by the total weight of the ethylene interpolymer product. Embodiments include ethylene interpolymer products where the first ethylene interpolymer has a first $M_w/M_n$, the second ethylene interpolymer has a second $M_w/M_n$ and the optional third ethylene has a third $M_w/M_n$; where the first $M_w/M_n$ is lower than said the $M_w/M_n$ and the optional third $M_w/M_n$. Further embodiments include ethylene interpolymer products where the blending of the second ethylene interpolymer and the third ethylene interpolymer produces a heterogeneous ethylene interpolymer blend that has a fourth $M_w/M_n$; where the fourth $M_w/M_n$ is not broader than said second $M_w/M_n$. Other embodiments of the ethylene interpolymer products disclosed herein have the second $M_w/M_n$ and the optional third $M_w/M_n$ less than about 4.0. Still other embodiments include ethylene interpolymer products where the first ethylene interpolymer has a first $CDBI_{50}$, the second ethylene interpolymer has a second $CDBI_{50}$ and the optional third ethylene interpolymer has a third $CDBI_{50}$; where the first $CDBI_{50}$ is higher than the second $CDBI_{50}$ and the third $CDBI_{50}$.

The metals that comprise the first total catalytic metal, i.e., the metallic catalyst residue in the ethylene interpolymer products disclosed herein are selected from one or titanium, zirconium, hafnium, vanadium or chromium.

Further embodiments of the present disclosure include manufactured articles comprising the ethylene interpolymer products disclosed herein. Non-limiting examples of flexible manufactured articles include mono or multi-layer films and embodiments of rigid manufactured articles include containers and lids; wherein the manufactured articles have one or more improved color indexes.

BRIEF DESCRIPTION OF FIGURES

The following Figures are presented for the purpose of illustrating selected embodiments of this disclosure; it being understood, that the embodiments shown do not limit this disclosure.

DEFINITION OF TERMS

Other than in the examples or where otherwise indicated, all numbers or expressions referring to quantities of ingredients, extrusion conditions, etc., used in the specification and claims are to be understood as modified in all instances by the term "about". Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

Herein the term "desired color index" defines a measurement of color, e.g. a number that correlates with an observer's perception of a color, where the observer has normal color vision. Non-limiting examples of color indexes, include "a Whiteness Index (WI)" and "a Yellowness Index (YI)"; in this disclosure WI and YI are measured according to ASTM E313-10.

Figure 1:
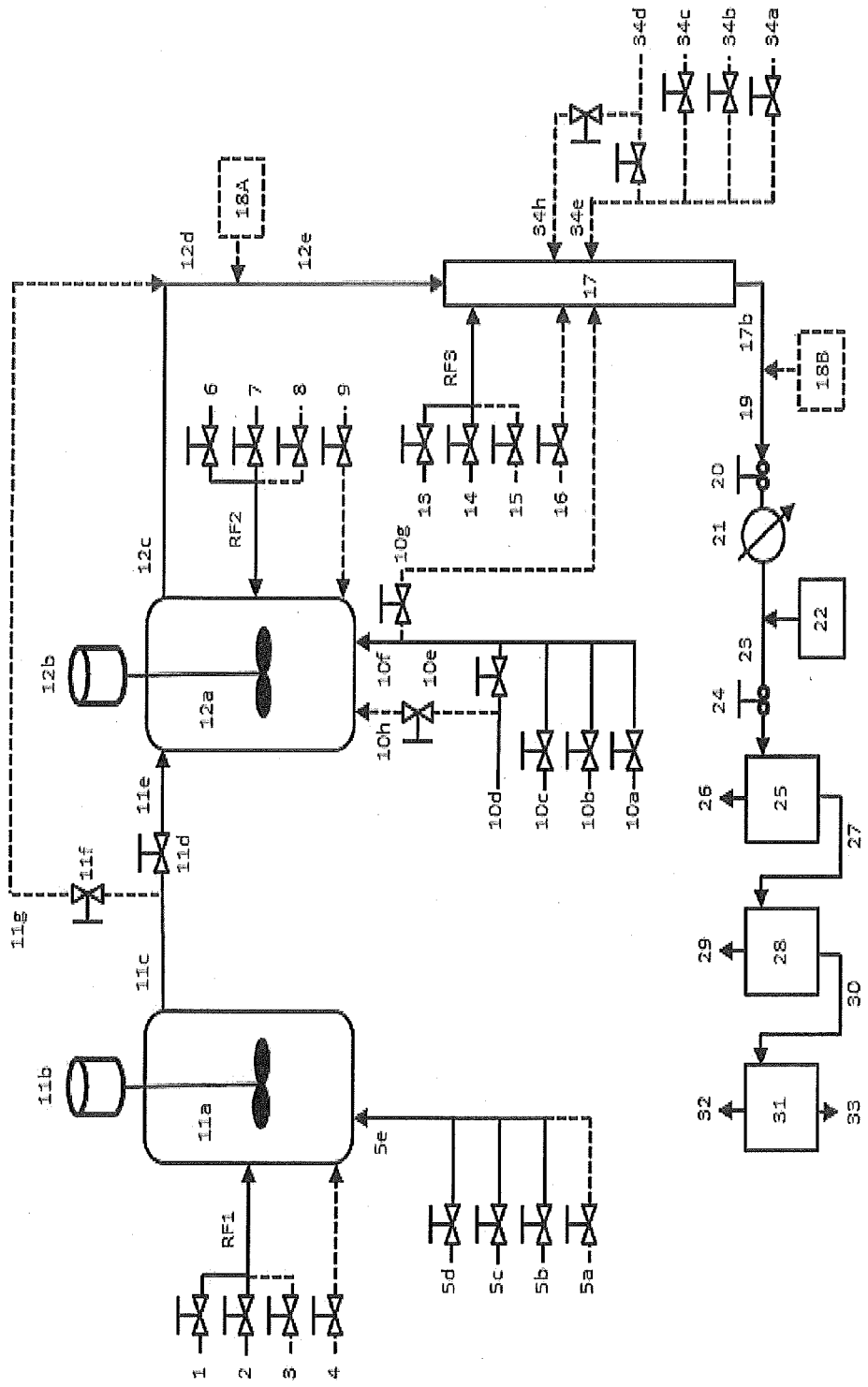
FIG. 1 illustrates a continuous solution polymerization process where an in-line heterogeneous catalyst formulation is employed.
Figure 2:
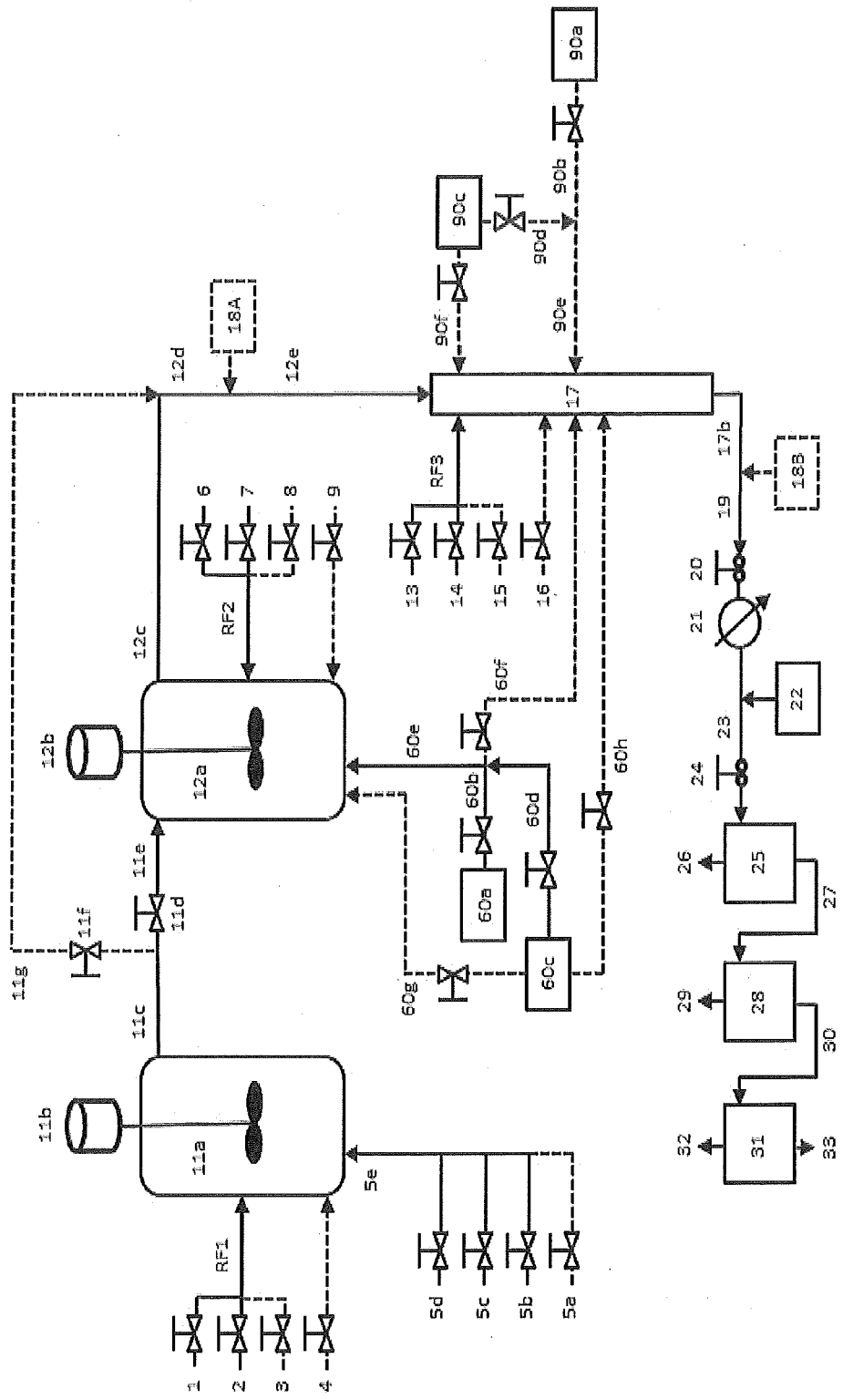
FIG. 2 illustrates a continuous solution polymerization process where a batch heterogeneous catalyst formulation is employed.

In this disclosure the term "a first catalyst solution temperature" is equivalent to the term "CST-1"; referring to embodiments shown in FIGS. 1 and 2, CST-1 is the temperature of process stream 5e. The term "a second catalyst solution temperature" is equivalent to the term "CST-2" and refers to embodiments shown in FIGS. 1 and 2; specifically: in FIG. 1, CST-2 is the temperature of process stream 10f; in FIG. 2, CST-2 is the is the temperature of process stream 60e. In optional embodiments, the term "a third catalyst solution temperature" is equivalent to the term "CST-3" and refers to embodiments shown in FIGS. 1 and 2; specifically: in FIG. 1 embodiments, CST-3 is the temperature of process stream 10g or 34e, and; in FIG. 2 embodiments, CST-3 is the temperature of process stream 60e or 90e.

In this disclosure the term "polyethylene composition" is used to refer to Comparative Examples of ethylene interpolymers; specifically Comparative Example H and Comparative Example E. Further, the term "second total catalytic metal" refers to the total amount of metallic catalyst residue in the polyethylene compositions, i.e., comparative examples. In contrast, the term "first total catalytic metal" refers to the total amount of metallic catalyst residue in embodiments of the disclosed ethylene interpolymer products.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain.

As used herein, the term "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymer produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using metallocene or single-site catalysts. Typically, homogeneous ethylene interpolymers have narrow molecular weight distributions, for example, gel permeation chromatography (GPC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e., each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically, the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers.

It is well known to those skilled in the art, that homogeneous ethylene interpolymers are frequently further subdivided into "linear homogeneous ethylene interpolymers" and "substantially linear homogeneous ethylene interpolymers". These two subgroups differ in the amount of long chain branching: more specifically, linear homogeneous ethylene interpolymers have less than about 0.01 long chain branches per 1000 carbon atoms; while substantially linear ethylene interpolymers have greater than about 0.01 to about 3.0 long chain branches per 1000 carbon atoms. A long chain branch is macromolecular in nature, i.e., similar in length to the macromolecule that the long chain branch is attached to. Hereafter, in this disclosure, the term "homogeneous ethylene interpolymer" refers to both linear homogeneous ethylene interpolymers and substantially linear homogeneous ethylene interpolymers.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers commonly used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl ($—CH_3$) and ethyl ($—CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" and its superscript form "$^{R1}$" refers to a first reactor in a continuous solution polymerization process; it being understood that R1 is distinctly different from the symbol $R^1$; the latter is used in chemical formula, e.g., representing a hydrocarbyl group. Similarly, the term "R2" and it's superscript form "$^{R2}$" refers to a second reactor, and; the term "R3" and it's superscript form "$^{R3}$" refers to a third reactor.

As used herein, the term "oligomers" refers to an ethylene polymer of low molecular weight, e.g., an ethylene polymer with a weight average molecular weight (Mw) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

DETAILED DESCRIPTION

Catalysts

Organometallic catalyst formulations that are efficient in polymerizing olefins are well known in the art. In the embodiments disclosed herein, at least two catalyst formulations are employed in a continuous solution polymerization process. One of the catalyst formulations comprises at least one single-site catalyst formulation that produces a homogeneous first ethylene interpolymer. The other catalyst formulation comprises at least one heterogeneous catalyst formulation that produces a heterogeneous second ethylene interpolymer. Optionally a third ethylene interpolymer may be produced using the heterogeneous catalyst formulation that was used to produce the second ethylene interpolymer, or a different heterogeneous catalyst formulation may be used to produce the third ethylene interpolymer. In the continuous solution process, the at least one homogeneous ethylene interpolymer and the at least one heterogeneous ethylene interpolymer are solution blended and an ethylene interpolymer product is produced.

Single Site Catalyst Formulation

The catalyst components which make up the single site catalyst formulation are not particularly limited, i.e. a wide variety of catalyst components can be used. One non-limiting embodiment of a single site catalyst formulation comprises the following three or four components: a bulky ligand-metal complex; an alumoxane co-catalyst; an ionic activator and optionally a hindered phenol. In Tables 1A, 2A, 3A and 4A of this disclosure: "(i)" refers to the amount of "component (i)", i.e., the bulky ligand-metal complex added to R1; "(ii)" refers to "component (ii)", i.e., the alumoxane co-catalyst; "(iii)" refers to "component (iii)" i.e. the ionic activator, and; "(iv)" refers to "component (iv)", i.e., the optional hindered phenol.

Non-limiting examples of component (i) are represented by formula (I):

$$(L^A)_a M(PI)_b (Q)_n \quad (I)$$

wherein ($L^A$) represents a bulky ligand; M represents a metal atom; PI represents a phosphinimine ligand; Q represents a leaving group; a is 0 or 1; b is 1 or 2; (a+b)=2; n is 1 or 2, and; the sum of (a+b+n) equals the valance of the metal M.

Non-limiting examples of the bulky ligand $L^A$ in formula (I) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of η-bonding to the metal M, such embodiments include both $\eta^3$-bonding and $\eta^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in formula (I) include Group 4 metals, titanium, zirconium and hafnium.

The phosphinimine ligand, PI, is defined by formula (II):

$$(R^P)_3 P=N— \quad (II)$$

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —Si($R^s$)$_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —Ge($R^G$)$_3$, wherein the $R^G$ groups are defined as $R^s$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ arty or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of component (i) of the single site catalyst formulation include structural, optical or enantiomeric isomers (meso and racemic isomers) and mixtures thereof of the bulky ligand-metal complexes described in formula (I) above.

The second single site catalyst component, component (ii), is an alumoxane co-catalyst that activates component (i) to a cationic complex. An equivalent term for "alumoxane" is "aluminoxane"; although the exact structure of this co-catalyst is uncertain, subject matter experts generally agree that it is an oligomeric species that contain repeating units of the general formula (III):

$$(R)_2 AlO—(Al(R)—O)_n—Al(R)_2 \quad (III)$$

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

The third catalyst component (iii) of the single site catalyst formation is an ionic activator. In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below;

$$[R^5]^+ [B(R^7)_4]^- \quad (IV)$$

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula —Si$(R^9)_3$, where each $R^9$ is independently selected from hydrogen atoms and $C_{1-4}$ alkyl radicals, and; compounds of formula (V);

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)-boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra (phenyl)boron, tri(dimethylphenyl)phosphonium tetra(phenyl)boron, tropillium tetrakispentafluorophenyl borate, triphenylmethylium tetrakispentafluorophenyl borate, benzene (diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst formation is a hindered phenol, component (iv). Non-limiting example of hindered phenols include butylated phenolic antioxidants, butylated hydroxytoluene, 2,4-di-tertiarybutyl-6-ethyl phenol, 4,4'-methylenebis (2,6-di-tertiarybutylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst formulation the quantity and mole ratios of the three or four components, (i) through (iv) are optimized as described below.

Heterogeneous Catalyst Formulations

A number of heterogeneous catalyst formulations are well known to those skilled in the art, including, as non-limiting examples, Ziegler-Natta and chromium catalyst formulations.

In this disclosure, embodiments include an in-line Ziegler-Natta catalyst formulation and a batch Ziegler-Natta catalyst formation. The term "in-line Ziegler-Natta catalyst formulation" refers to the continuous synthesis of a small quantity of active Ziegler-Natta catalyst and immediately injecting this catalyst into at least one continuously operating reactor, wherein the catalyst polymerizes ethylene and one or more optional α-olefins to form an ethylene interpolymer. The terms "batch Ziegler-Natta catalyst formulation" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst" refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, where an active catalyst is formed and polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. In Table 1A, 2A, 3A and 4A of this disclosure: "(v)" refers to "component (v)" the magnesium compound; the term "(vi)" refers to the "component (vi)" the chloride compound; "(vii)" refers to "component (vii)" the metal compound; "(viii)" refers to "component (viii)" alkyl aluminum co-catalyst, and; "(ix)" refers to "component (ix)" the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include Mg$(R^1)_2$; wherein the $R^1$ groups may be the same or different, linear, branched or cyclic hydrocarbyl radicals containing 1 to 10 carbon atoms. Non-limiting examples of chloride compounds include $R^2$Cl; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include Al$(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by formula (VI):

$$Al(R^4)_p(OR^5)_q(X)_r \qquad (VI)$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof. To produce an active in-line Ziegler-Natta catalyst formulation the quantity and mole ratios of the five components, (v) through (ix), are optimized as described below.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina. Heterogeneous catalyst formulations containing chromium may also include co-catalysts; non-limiting examples of co-catalysts include trialkylaluminum, alkylaluminoxane and dialkoxyalkylaluminum compounds and the like.

Solution Polymerization Process: In-Line Heterogeneous Catalyst Formulation

Embodiments of the continuous solution polymerization process that produces ethylene interpolymers having improved color, i.e., improved (higher) Whiteness Index (WI) and improved (lower) Yellowness Index (YI) are shown in FIG. 1. FIG. 1 is intended purely as examples and is not to be construed as limiting.

In an embodiment of the continuous solution polymerization process, process solvent, monomer(s) and a catalyst formulation are continuously fed to a reactor where the ethylene interpolymer is formed in solution. In FIG. 1, process solvent 1, ethylene 2 and optional α-olefin 3 are combined to produce reactor feed stream RF1 which flows into reactor 11a. In FIG. 1 optional streams, or optional embodiments, are denoted with dotted lines. It is not particularly important that combined reactor feed stream RF1 be formed; i.e., reactor feed streams can be combined in all possible combinations, including an embodiment where streams 1 through 3 are independently injected into reactor 11a. Optionally, hydrogen may be injected into reactor 11a through stream 4; hydrogen is generally added to control the molecular weight of the first ethylene interpolymer produced in reactor 11a. Reactor 11a is continuously stirred by stirring assembly 11b which includes a motor external to the reactor and an agitator within the reactor. In the art, such a reactor is frequently called a CSTR (Continuously Stirred Tank Reactor).

A single site catalyst formulation is injected into reactor 11a through stream 5e. Single site catalyst component streams 5d, 5c, 5b and optional 5a refer to the ionic activator (component (iii)), the bulky ligand-metal complex (component (i)), the alumoxane co-catalyst (component (ii)) and optional hindered phenol (component (iv)), respectively. Single site catalyst component streams can be arranged in all possible configurations, including an embodiment where streams 5a through 5d are independently injected into reactor 11a. Each single site catalyst component is dissolved in a catalyst component solvent. Catalyst component solvents, for component (i) through (iv), may be the same or different. Catalyst component solvents are selected such that the combination of catalyst components does not produce a precipitate in any process stream; for example, precipitation of a single site catalyst component in stream 5e. The optimization of the single site catalyst formulation is described below.

Reactor 11a produces a first exit stream, stream 11c, containing the first ethylene interpolymer dissolved in process solvent, as well as unreacted ethylene, unreacted α-olefins (if present), unreacted hydrogen (if present), active single site catalyst, deactivated single site catalyst, residual catalyst components and other impurities (if present). Melt index ranges and density ranges of the first ethylene interpolymer produced are described below.

The continuous solution polymerization process shown in FIG. 1 includes two embodiments where reactors 11a and 12a can be operated in series or parallel modes. In series mode 100% of stream 11c (the first exit stream) passes through flow controller 11d forming stream 11e which enters reactor 12a. In contrast, in parallel mode 100% of stream 11c passes through flow controller 11f forming stream 11g. Stream 11g by-passes reactor 12a and is combined with stream 12c (the second exit stream) forming stream 12d (the third exit stream).

Fresh reactor feed streams are injected into reactor 12a; process solvent 6, ethylene 7 and optional α-olefin 8 are combined to produce reactor feed stream RF2. It is not important that stream RF2 is formed; i.e., reactor feed streams can be combined in all possible combinations, including independently injecting each stream into the reactor. Optionally hydrogen may be injected into reactor 12a through stream 9 to control the molecular weight of the second ethylene interpolymer. Reactor 12a is continuously stirred by stirring assembly 12b which includes a motor external to the reactor and an agitator within the reactor.

An in-line heterogeneous catalyst formulation is injected into reactor 12a through stream 10f and a second ethylene interpolymer is formed in reactor 12a. The components that comprise the in-line heterogeneous catalyst formulation are introduced through streams 10a, 10b, 10c and 10d. A first heterogeneous catalyst assembly, defined by the conduits and flow controllers associated with streams 10a-10h, is operated as described below. In the case of a Ziegler-Natta catalyst, the first heterogeneous catalyst assembly produces an efficient in-line Ziegler-Natta catalyst formulation by optimizing the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii), and; (aluminum alkyl)/(metal compound) or (ix)/(vii); as well as the time these compounds have to react and equilibrate.

Stream 10a (stream S1) contains a binary blend of a magnesium compound, component (v) and an aluminum alkyl, component (ix), in process solvent. The upper limit on the (aluminum alkyl)/(magnesium compound) molar ratio in stream 10a may be about 70, in some cases about 50 and is other cases about 30. The lower limit on the (aluminum alkyl)/(magnesium compound) molar ratio may be about 3.0, in some cases about 5.0 and in other cases about 10. Stream 10b (stream S2) contains a solution of a chloride compound, component (vi), in process solvent. Stream 10b is combined with stream 10a and the intermixing of streams 10a and 10b produces a magnesium chloride catalyst support. To produce an efficient in-line Ziegler-Natta catalyst (efficient in olefin polymerization), the (chloride compound)/(magnesium compound) molar ratio is optimized. The upper limit on the (chloride compound)/(magnesium compound) molar ratio may be about 4, in some cases about 3.5 and is other cases about 3.0. The lower limit on the (chloride compound)/(magnesium compound) molar ratio may be about 1.0, in some cases about 1.5 and in other cases about 1.9. The time between the addition of the chloride compound and the addition of the metal compound (component (vii)) via stream 10c (stream S3) is controlled; hereafter HUT-1 (the first Hold-Up-Time). HUT-1 is the time for streams 10a (stream S1) and 10b (stream S2) to equilibrate and form a magnesium chloride support. The upper limit on HUT-1 may be about 70 seconds, in some cases about 60 seconds and is other cases about 50 seconds. The lower limit on HUT-1 may be about 5 seconds, in some cases about 10 seconds and in other cases about 20 seconds. HUT-1 is controlled by adjusting the length of the conduit between stream 10b injection port and stream 10c injection port, as well as controlling the flow rates of streams 10a and 10b. The time between the addition of component (vii) and the addition of the alkyl aluminum co-catalyst, component (viii), via stream 10d (stream S4) is controlled; hereafter HUT-2 (the second Hold-Up-Time). HUT-2 is the time for the magnesium chloride support and stream 10c to react and equilibrate. The upper limit on HUT-2 may be about 50 seconds, in some cases about 35 seconds and is other cases about 25 seconds. The lower limit on HUT-2 may be about 2 seconds, in some cases about 6 seconds and in other cases about 10 seconds. HUT-2 is controlled by adjusting the length of the conduit between stream 10c injection port and stream 10d injection port, as well as controlling the flow rates of streams 10a, 10b and 10c. The quantity of the alkyl aluminum co-catalyst added is optimized to produce an efficient catalyst; this is accomplished by adjusting the (alkyl aluminum co-catalyst)/(metal compound) molar ratio, or (viii)/(vii) molar ratio. The upper limit on the (alkyl aluminum co-catalyst)/(metal compound) molar ratio may be about 10, in some cases about 7.5 and is other cases about 6.0. The lower limit on the (alkyl aluminum co-catalyst)/(metal compound) molar ratio may be 0, in some cases about 1.0 and in other cases about 2.0. In addition, the time between the addition of the alkyl aluminum co-catalyst (stream S4) and the injection of the in-line Ziegler-Natta catalyst formulation into reactor 12a is controlled; hereafter HUT-3 (the third Hold-Up-Time). HUT-3 is the time for stream 10d to intermix and equilibrate to form the in-line Ziegler Natta catalyst formulation. The upper limit on HUT-3 may be about 15 seconds, in some cases about 10 seconds and is other cases about 8 seconds. The lower limit on HUT-3 may be about 0.5 seconds, in some cases about 1 seconds and in other cases about 2 seconds. HUT-3 is controlled by adjusting the length of the conduit between stream 10d injection port and the catalyst injection port in reactor 12a, and by controlling the flow rates of streams 10a through 10d. As shown in FIG. 1, optionally, 100% of stream 10d, the alkyl aluminum co-catalyst, may be injected directly into reactor 12a via stream 10h. Optionally, a portion of stream 10d may be injected directly into reactor 12a via stream 10h and the remaining portion of stream 10d injected into reactor 12a via stream 10f.

As previously indicated, an equivalent term for reactor 12a is "R2". The quantity of in-line heterogeneous catalyst formulation added to R2 is expressed as the parts-per-million (ppm) of metal compound (component (vii)) in the reactor solution, hereafter "R2 (vii) (ppm)". The upper limit on R2 (vii) (ppm) may be about 10 ppm, in some cases about 8 ppm and in other cases about 6 ppm. The lower limit on R2 (vii) (ppm) in some cases may be about 0.5 ppm, in other cases about 1 ppm and in still other cases about 2 ppm. The (aluminum alkyl)/(metal compound) molar ratio in reactor 12a, or the (ix)/(vii) molar ratio, is also controlled. The upper limit on the (aluminum alkyl)/(metal compound) molar ratio in the reactor may be about 2, in some cases about 1.5 and is other cases about 1.0. The lower limit on the (aluminum alkyl)/(metal compound) molar ratio may be about 0.05, in some cases about 0.075 and in other cases about 0.1.

Any combination of the streams employed to prepare and deliver the in-line heterogeneous catalyst formulation to R2 may be heated or cooled, i.e., streams 10a through 10h (including stream 10g (optional R3 delivery) which is discussed below); in some cases the upper temperature limit of streams 10a through 10g may be about 90° C., in other cases about 80° C. and in still other cases about 70° C. and; in some cases the lower temperature limit may be about 20° C.; in other cases about 35° C. and in still other cases about 50° C. In this disclosure a first heterogeneous catalyst formulation is prepared having "a second catalyst solution temperature", or "CST-2". Referring to FIG. 1 embodiments, CST-2 is the temperature of process stream 10f. Referring to FIG. 2 embodiments, CST-2 is the temperature of process stream 60e. The flow rate through process streams 10f or 60e can vary over a wide range, e.g., depending on catalyst activity and reactor volume. In this disclosure, the flow rate through process streams 10f or 60e is expressed as a percent of the total amount of process solvent exiting R2: the upper limit on the flow rate through process stream 10f or 60e may be about 20%, in other cases about 15% and in still other cases about 10% of the total amount of process solvent exiting R2; the lower limit on the flow rate through process stream 10f or 60e may be about 0.01%, in other cases about 0.05% and in still other cases about 0.1% of the total process solvent exiting R2.

Injection of the in-line heterogeneous catalyst formulation into reactor 12a produces a second ethylene interpolymer and a second exit stream 12c.

If reactors 11a and 12a are operated in a series mode, the second exit stream 12c contains the second ethylene interpolymer and the first ethylene interpolymer dissolved in process solvent; as well as unreacted ethylene, unreacted α-olefins (if present), unreacted hydrogen (if present), active catalysts, deactivated catalysts, catalyst components and other impurities (if present). Optionally the second exit stream 12c is deactivated by adding a catalyst deactivator A from catalyst deactivator tank 18A forming a deactivated solution A, stream 12e; in this case, FIG. 1 defaults to a dual reactor solution process. If the second exit stream 12c is not deactivated the second exit stream enters tubular reactor 17. Catalyst deactivator A is discussed below.

If reactors 11a and 12a are operated in parallel mode, the second exit stream 12c contains the second ethylene interpolymer dissolved in process solvent. The second exit stream 12c is combined with stream 11g forming a third exit stream 12d, the latter contains the second ethylene interpolymer and the first ethylene interpolymer dissolved in process solvent; as well as unreacted ethylene, unreacted α-olefins (if present), unreacted hydrogen (if present), active catalyst, deactivated catalyst, catalyst components and other impurities (if present). Optionally the third exit stream 12d is deactivated by adding catalyst deactivator A from catalyst deactivator tank 18A forming deactivated solution A, stream 12e; in this case, FIG. 1 defaults to a dual reactor solution process. If the third exit stream 12d is not deactivated the third exit stream 12d enters tubular reactor 17.

The term "tubular reactor" is meant to convey its conventional meaning, namely a simple tube; wherein the length/diameter (L/D) ratio is at least 10/1. Optionally, one or more of the following reactor feed streams may be injected into tubular reactor 17; process solvent 13, ethylene 14 and α-olefin 15. As shown in FIG. 1, streams 13, 14 and 15 may be combined forming reactor feed stream RF3 and the latter is injected into reactor 17. It is not particularly important that stream RF3 be formed; i.e. reactor feed streams can be combined in all possible combinations. Optionally hydrogen may be injected into reactor 17 through stream 16. Optionally, the in-line heterogeneous catalyst formulation may be injected into reactor 17 via catalyst stream 10g; i.e., a portion of the in-line heterogeneous catalyst enters reactor 12a through stream 10f and the remaining portion of the in-line heterogeneous catalyst enters reactor 17 through stream 10g.

FIG. 1 shows an additional embodiment where reactor 17 is supplied with a second heterogeneous catalyst formulation produced in a second heterogeneous catalyst assembly. The second heterogeneous catalyst assembly refers to the combination of conduits and flow controllers that include streams 34a-34e and 34h. The chemical composition of the first and second heterogeneous catalyst formulations may be the same, or different. In the case of a Ziegler-Natta catalyst, the second heterogeneous catalyst assembly produces a second in-line Ziegler-Natta catalyst formulation. For example, the catalyst components ((v) through (ix)), mole ratios and hold-up-times may differ in the first and second heterogeneous catalyst assemblies. Relative to the first heterogeneous catalyst assembly, the second heterogeneous catalyst assembly is operated in a similar manner, i.e., the second heterogeneous catalyst assembly generates an efficient catalyst by optimizing hold-up-times and the following molar ratios: (aluminum alkyl)/(magnesium compound), (chloride compound)/(magnesium compound), (alkyl aluminum co-catalyst/(metal compound, and (aluminum alkyl)/(metal compound). To be clear: stream 34a contains a binary blend of magnesium compound (component (v)) and aluminum alkyl (component (ix)) in process solvent; stream 34b contains a chloride compound (component (vi)) in process solvent; stream 34c contains a metal compound (component (vii)) in process solvent, and; stream 34d contains an alkyl aluminum co-catalyst (component (viii)) in process solvent. Once prepared, the in-line Ziegler-Natta catalyst is injected into reactor 17 through stream 34e; optionally, additional alkyl aluminum co-catalyst is injected into reactor 17 through stream 34h. As shown in FIG. 1, optionally, 100% of stream 34d, the alkyl aluminum co-catalyst, may be injected directly into reactor 17 via stream 34h. Optionally, a portion of stream 34d may be injected directly into reactor 17 via stream 34h and the remaining portion of stream 34d injected into reactor 17 via stream 34e. In FIG. 1, the first or the second heterogeneous catalyst assembly supplies 100% of the catalyst to reactor 17. Any combination of the streams that comprise the second heterogeneous catalyst assembly may be heated or cooled, i.e., streams 34a-34e and 34h; in some cases the upper temperature limit of streams 34a-34e and 34h may be about 90° C., in other cases about 80° C. and in still other cases about 70° C. and; in some cases the lower temperature limit may be about 20° C.; in other cases about 35° C. and in still other cases about 50° C. In an embodiment of this disclosure a second heterogeneous catalyst formulation is prepared having "a third catalyst solution temperature", or "CST-3". Referring to FIG. 1 embodiments, CST-3 is the temperature of process stream 34e. The flow rate through process stream 34e can vary over a wide range, e.g., depending on catalyst activity and reactor volume. In this disclosure, the flow rate through process stream 34e is expressed as a percent of the total amount of process solvent exiting R3: the upper limit on the flow rate through process stream 34e may be about 20%, in other cases about 15% and in still other cases about 10% of the total amount of process solvent exiting R3; the lower limit on the flow rate through process stream 34e may be about 0.01%, in other cases about 0.05% and in still other cases about 0.1% of the total process solvent exiting R3.

In reactor 17 a third ethylene interpolymer may, or may not, form. A third ethylene interpolymer will not form if catalyst deactivator A is added upstream of reactor 17 via catalyst deactivator tank 18A. A third ethylene interpolymer will be formed if catalyst deactivator B is added downstream of reactor 17 via catalyst deactivator tank 18B.

The optional third ethylene interpolymer produced in reactor 17 may be formed using a variety of operational modes; with the proviso that catalyst deactivator A is not added upstream of reactor 17. Non-limiting examples of operational modes include: (a) residual ethylene, residual optional α-olefin and residual active catalyst entering reactor 17 react to form the optional third ethylene interpolymer, or; (b) fresh process solvent 13, fresh ethylene 14 and optionally fresh α-olefin 15 are added to reactor 17 and the residual active catalyst entering reactor 17 forms the optional third ethylene interpolymer, or; (c) the fresh second in-line heterogeneous catalyst formulation is added to reactor 17 via stream 10g or stream 34e to polymerize residual ethylene and residual optional α-olefin to form the optional third ethylene interpolymer, or; (d) fresh process solvent 13, ethylene 14, optional α-olefin 15 and fresh second in-line heterogeneous catalyst formulation (10g or 34e) are added to reactor 17 to form the optional third ethylene interpolymer. Optionally, 100% of the alkyl aluminum co-catalyst may be added to reactor 17 via stream 34h, or a portion of the alkyl aluminum co-catalyst may be added to reactor 17 via stream 10g or 34h and the remaining portion added via stream 34h. Optionally fresh hydrogen 16 may be added to reduce the molecular weight of the optional third optional ethylene interpolymer.

In series mode, Reactor 17 produces a third exit stream 17b containing the first ethylene interpolymer, the second ethylene interpolymer and optionally a third ethylene interpolymer. As shown in FIG. 1, catalyst deactivator B may be added to the third exit stream 17b via catalyst deactivator tank 18B producing a deactivated solution B, stream 19; with the proviso that catalyst deactivator B is not added if catalyst deactivator A was added upstream of reactor 17. Deactivated solution B may also contain unreacted ethylene, unreacted optional α-olefin, unreacted optional hydrogen and impurities if present. As indicated above, if catalyst deactivator A was added, deactivated solution A (stream 12e) exits tubular reactor 17 as shown in FIG. 1.

In parallel mode operation, reactor 17 produces a fourth exit stream 17b containing the first ethylene interpolymer, the second ethylene interpolymer and optionally a third ethylene interpolymer. As indicated above, in parallel mode, stream 12d is the third exit stream. As shown in FIG. 1, in parallel mode, catalyst deactivator B is added to the fourth exit stream 17b via catalyst deactivator tank 18B producing a deactivated solution B, stream 19; with the proviso that catalyst deactivator B is not added if catalyst deactivator A was added upstream of reactor 17.

In FIG. 1, deactivated solution A (stream 12e) or B (stream 19) passes through pressure let down device 20, heat exchanger 21 and a passivator is added via tank 22 forming a passivated solution 23; the passivator is described below. The passivated solution passes through pressure let down device 24 and enters a first vapor/liquid separator 25. Hereafter, "V/L" is equivalent to vapor/liquid. Two streams are formed in the first V/L separator: a first bottom stream 27 comprising a solution that is rich in ethylene interpolymers and also contains residual ethylene, residual optional α-olefins and catalyst residues, and; a first gaseous overhead stream 26 comprising ethylene, process solvent, optional α-olefins, optional hydrogen, oligomers and light-end impurities if present.

The first bottom stream enters a second V/L separator 28. In the second V/L separator two streams are formed: a second bottom stream 30 comprising a solution that is richer in ethylene interpolymer and leaner in process solvent relative to the first bottom stream 27, and; a second gaseous overhead stream 29 comprising process solvent, optional α-olefins, ethylene, oligomers and light-end impurities if present.

The second bottom stream 30 flows into a third V/L separator 31. In the third V/L separator two streams are formed: a product stream 33 comprising an ethylene interpolymer product, deactivated catalyst residues and less than 5 weight % of residual process solvent, and; a third gaseous overhead stream 32 comprised essentially of process solvent, optional α-olefins and light-end impurities if present.

Product stream 33 proceeds to polymer recovery operations. Non-limiting examples of polymer recovery operations include one or more gear pump, single screw extruder or twin screw extruder that forces the molten ethylene interpolymer product through a pelletizer. A devolatilizing extruder may be used to remove small amounts of residual process solvent and optional α-olefin, if present. Once pelletized the solidified ethylene interpolymer product is typically dried and transported to a product silo.

The first, second and third gaseous overhead streams shown in FIG. 1 (streams 26, 29 and 32, respectively) are sent to a distillation column where solvent, ethylene and optional α-olefin are separated for recycling, or; the first, second and third gaseous overhead streams are recycled to the reactors, or; a portion of the first, second and third gaseous overhead streams are recycled to the reactors and the remaining portion is sent to a distillation column.

Solution Polymerization Process: Batch Heterogeneous Catalyst Formulation

Additional embodiments of the continuous solution polymerization process employed to provide ethylene interpolymers having improved color, i.e., improved (higher) Whiteness Index (WI) and improved (lower) Yellowness Index (YI) are shown in FIG. 2. FIG. 2 is intended purely as examples and is not to be construed as limiting.

In FIG. 2 a first batch heterogeneous catalyst assembly (vessels and streams 60a through 60h) and an optional second batch heterogeneous catalyst assembly (vessels and streams 90a through 90f) are employed. For the sake of clarity and avoid any confusion, many of the vessels and streams shown in FIG. 2 are equivalent to the respective vessel and stream shown in FIG. 1; equivalence is indicated through the use of a consistent vessel or stream label, i.e., number. For the avoidance of doubt, referring to FIG. 2, process solvent is injected into CSTR reactor 11a, CSTR reactor 12a and tubular reactor 17 via streams 1, 6 and 13. Ethylene is injected into reactors 11a, 12a and 17 via streams 2, 7 and 14. Optional α-olefin is injected into reactors 11a, 12a and 17 via streams 3, 8 and 15. Optional hydrogen is injected into reactors 11a, 12a and 17 via streams 4, 9 and 16. A single-site catalyst formulation is injected into reactor 11a, producing the first ethylene interpolymer. Single-site catalyst component streams (5a through 5e) were described above. A batch Ziegler-Natta catalyst formulation or a batch Ziegler-Natta procatalyst is injected into reactor 12a via stream 60e and the second ethylene interpolymer is formed. Reactors 11a and 12a shown in FIG. 2 may be operated in series or parallel modes, as described in FIG. 1 above.

Processes to prepare batch heterogeneous procatalysts and in batch Ziegler-Natta procatalysts are well known to those skilled in the art. A non-limiting formulation useful in the continuous solution polymerization process may be prepared as follows. A batch Ziegler-Natta procatalyst may be prepared by sequentially added the following components to a stirred mixing vessel: (a) a solution of a magnesium compound (an equivalent term for the magnesium compound is "component (v)"); (b) a solution of a chloride compound (an equivalent term for the chloride compound is "component (vi)"; (c) optionally a solution of an aluminum alkyl halide, and; (d) a solution of a metal compound (an equivalent term for the metal compound is "component (vii)"). Suitable, non-limiting examples of aluminum alkyl halides are defined by the formula $(R^6)_vAlX_{3-v}$; wherein the $R^6$ groups may be the same or different hydrocarbyl group having from 1 to 10 carbon atoms, X represents chloride or bromide, and; v is 1 or 2. Suitable, non-limiting examples of the magnesium compound, the chloride compound and the metal compound were described earlier in this disclosure. Suitable solvents within which to prepare the procatalyst include linear or branched $C_5$ to $C_{12}$ alkanes or mixtures thereof. Individual mixing times and mixing temperatures may be used in each of steps (a) through (d). The upper limit on mixing temperatures for steps (a) through (d) in some case may be 160° C., in other cases 130° C. and in still other cases 100° C. The lower limit on mixing temperatures for steps (a) through (d) in some cases may be 10° C., in other cases 20° C. and in still other cases 30° C. The upper limit on mixing time for steps (a) through (d) in some case may be 6 hours, in other cases 3 hours and in still other cases 1 hour. The lower limit on mixing times for steps (a) through (d) in some cases may be 1 minute, in other cases 10 minutes and in still other cases 30 minutes.

Batch Ziegler-Natta procatalyst can have various catalyst component mole ratios. The upper limit on the (chloride compound)/(magnesium compound) molar ratio in some cases may be about 3, in other cases about 2.7 and is still other cases about 2.5; the lower limit in some cases may be about 2.0, in other cases about 2.1 and in still other cases about 2.2. The upper limit on the (magnesium compound)/(metal compound) molar ratio in some cases may be about 10, in other cases about 9 and in still other cases about 8; the lower limit in some cases may be about 5, in other cases about 6 and in still other cases about 7. The upper limit on the (aluminum alkyl halide)/(magnesium compound) molar ratio in some cases may be about 0.5, in other cases about 0.4 and in still other cases about 0.3; the lower limit in some cases may be 0, in other cases about 0.1 and in still other cases about 0.2. An active batch Ziegler-Natta catalyst formulation is formed when the procatalyst is combined with an alkyl aluminum co-catalyst. Suitable co-catalysts were described earlier in this disclosure. The procatalyst may be activated external to the reactor or in the reactor; in the latter case, the procatalyst and an appropriate amount of alkyl aluminum co-catalyst are independently injected R2 and optionally R3.

Once prepared, the batch Ziegler-Natta procatalyst is pumped to procatalyst storage tank 60a shown in FIG. 2. Tank 60a may, or may not, be agitated. Storage tank 60c contains an alkyl aluminum co-catalyst; non-limiting examples of suitable alkyl aluminum co-catalysts were described earlier in this disclosure. A batch Ziegler Natta catalyst formulation stream 60e, that is efficient in converting olefins to polyolefins, is formed by combining batch Ziegler Natta procatalyst stream 60b (stream S5) with alkyl aluminum co-catalyst stream 60d (stream S4). Stream 60e is injected into reactor 12a where the second ethylene interpolymer is formed. Operationally, the following options may be employed: (a) 100% of the alkyl aluminum co-catalyst may be injected into reactor 12a through stream 60g, i.e., the batch Ziegler-Natta procatalyst is injected into reactor 12a through stream 60e, or; (b) a portion of the alkyl aluminum co-catalyst is injected into reactor 12a via stream 60g and the remaining portion passes through stream 60d where it combines with stream 60b forming the batch Ziegler-Natta catalyst formulation which is injected into reactor 12a via stream 60e. In this disclosure, a first heterogeneous catalyst formulation is prepared having "a second catalyst solution temperature", or "CST-2". Referring to FIG. 2 embodiments, CST-2 is the temperature of process stream 60e.

Additional optional embodiments, where a batch heterogeneous catalyst formulation is employed, are shown in FIG. 2 where: (a) a batch Ziegler-Natta procatalyst is injected into tubular reactor 17 through stream 60f, or; (b) a batch Ziegler-Natta catalyst formulation is injected into tubular reactor 17 through stream 60f. In the case of option (a), 100% of the alkyl aluminum co-catalyst is injected directly into reactor 17 via stream 60h. An additional embodiment exists where a portion of the alkyl aluminum co-catalyst flows through stream 60f and the remaining portion flows through stream 60h. Any combination of tanks or streams 60a through 60h may be heated or cooled. In this disclosure the first heterogeneous catalyst formulation may also be injected into tubular reactor 17 at "a third catalyst solution temperature", or "CST-3". In this case, referring to FIG. 2 embodiments, CST-3 is the temperature of process stream 60f or 90e. The flow rate ranges through streams 60f or 90e are similar to those recited for process stream 60e (above).

FIG. 2 includes additional embodiments where a second batch heterogeneous catalyst assembly, which is defined by vessels and streams 90a through 90f, may be used to optionally inject a second batch Ziegler-Natta catalyst formulation or a second batch Ziegler-Natta procatalyst into reactor 17. Once prepared the second batch Ziegler-Natta procatalyst is pumped to procatalyst storage tank 90a shown in FIG. 2. Tank 90a may, or may not, be agitated. Storage tank 90c contains an alkyl aluminum co-catalyst. A batch Ziegler Natta catalyst formulation stream 90e, that is efficient in converting olefins to polyolefins, is formed by combining the second batch Ziegler Natta procatalyst stream 90b (stream S6) with alkyl aluminum co-catalyst stream 90d (optionally stream S4). Stream 90e is optionally injected into reactor 17, wherein an optional third ethylene interpolymer may be formed. FIG. 2 includes additional embodiments where: (a) the batch Ziegler-Natta procatalyst is injected directly into reactor 17 through stream 90e and the procatalyst is activated inside reactor 17 by injecting 100% of the aluminum co-catalyst directly into rector 17 via stream 90f, or; (b) a portion of the aluminum co-catalyst may flow through stream 90e with the remaining portion flowing through stream 90f. Any combination of tanks or streams 90a through 90f may be heated or cooled. In this disclosure a second heterogeneous catalyst formulation is prepared having "a third catalyst solution temperature", or "CST-3". In this case, referring to FIG. 2 embodiments, CST-3 is the temperature of process stream 90e.

The time between the addition of the alkyl aluminum co-catalyst (stream S4) and the injection of the batch Ziegler-Natta catalyst formulation into reactor 12a is controlled; hereafter HUT-4 (the fourth Hold-Up-Time). Referring to FIG. 2, HUT-4 is the time for stream 60d (stream S4) to intermix and equilibrate with stream 60b (batch Ziegler-Natta procatalyst) to form the batch Ziegler Natta catalyst formulation prior to injection into reactor 12a via in stream 60e. Optionally, HUT-4 is the time for stream 60d to intermix and equilibrate with stream 60b to from the batch Ziegler-Natta catalyst formulation prior to injection into the optional third reactor 17 via stream 60f, or; HUT-4 is the time for stream 90d to intermix and equilibrate with stream 90b to form the batch Ziegler-Natta catalyst formulation prior to injection into reactor 17 via stream 90e. The upper limit on HUT-4 may be about 300 seconds, in some cases about 200 seconds and in other cases about 100 seconds. The lower limit on HUT-4 may be about 0.1 seconds, in some cases about 1 seconds and in other cases about 10 seconds.

The quantity of batch Ziegler-Natta procatalyst produced and/or the size to procatalyst storage tanks 60a or 90a is not particularly important with respect to this disclosure. However, the large quantity of procatalyst produced allows one to operate the continuous solution polymerization plant for an extended period of time: the upper limit on this time in some cases may be about 3 months, in other cases for about 2 months and in still other cases for about 1 month; the lower limit on this time in some cases may be about 1 day, in other cases about 1 week and in still other cases about 2 weeks.

The quantity of batch Ziegler-Natta procatalyst or batch Ziegler-Natta catalyst formulation added to reactor 12a is expressed as "R2 (vii) (ppm)", i.e., the parts-per-million (ppm) of metal compound (component (vii)) in the reactor solution. The upper limit on R2 (vii) (ppm) may be about 10 ppm, in some cases about 8 ppm and in other cases about 6 ppm. The lower limit on R2 (vii) (ppm) may be about 0.5 ppm, in some cases about 1 ppm and in other cases about 2 ppm. The quantity of the alkyl aluminum co-catalyst added to reactor 12a is optimized to produce an efficient catalyst; this is accomplished by adjusting the (alkyl aluminum co-catalyst)/(metal compound) molar ratio. The upper limit on the (alkyl aluminum co-catalyst)/(metal compound) molar ratio may be about 10, in some cases about 8.0 and is other cases about 6.0. The lower limit on the (alkyl aluminum co-catalyst)/(metal compound) molar ratio may be 0.5, in some cases about 0.75 and in other cases about 1.

Referring to FIG. 2, where the heterogeneous catalyst formulation is a batch Ziegler-Natta catalyst formulation, a third ethylene interpolymer may optionally be formed in reactor 17 by: (a) injecting the first batch Ziegler-Natta catalyst formulation or the first batch Ziegler-Natta procatalyst into reactor 17 through stream 60f, or; (b) injecting a chemically distinct second batch Ziegler-Natty catalyst formulation or second batch Ziegler-Natta procatalyst into reactor 17 through stream 90e. As shown in FIG. 2, the first batch Ziegler-Natta catalyst formulation may be deactivated upstream of reactor 17 by adding catalyst deactivator A via deactivator tank 18A to form a deactivated solution A (stream 12e), or; the first batch Ziegler-Natta catalyst formulation and optionally the second batch Ziegler-Natta catalyst formulation may be deactivated downstream of reactor 17 by adding catalyst deactivator B via deactivator tank 18B to form a deactivated solution B (stream 19). Deactivated solution A or B then pass through pressure let down device 20, heat exchange 21 and a passivator may be added via tank 22 forming passivated solution 23. The remaining vessels (24, 25, 28 and 31) and streams (26, 27, 29, 39, 32 and 33) and process conditions have been described previously. The ethylene interpolymer product stream 33 proceeds to polymer recovery. The first, second and third gaseous overhead streams shown in FIG. 2 (streams 26, 29 and 32, respectively) are sent to a distillation column where solvent, ethylene and optional α-olefin are separated for later use, or; the first, second and third gaseous overhead streams are recycled to the reactors, or; a portion of the first, second and third gaseous overhead streams are recycled to the reactors and the remaining portion is sent to a distillation column.

Optimization of the Single Site Catalyst Formulation

Referring to the embodiments shown in FIGS. 1 and 2; an active single site catalyst formulation is produced by optimizing the proportion of each of the four single site catalyst components, (i) through (iv). The term "active" means the single site catalyst formulation is very efficient in converting olefins to polyolefins; in practice the optimization objective is to maximize the following ratio: (pounds of ethylene interpolymer product produced)/(pounds of catalyst consumed). The quantity of bulky ligand metal complex, component (i), added to R1 is expressed as the parts per million (ppm) of component (i) in the total mass of the solution in R1; hereafter "R1 (i) (ppm)". The upper limit on R1 (i) (ppm) may be about 5, in some cases about 3 and is other cases about 2. The lower limit on R1 (i) (ppm) may be about 0.02, in some cases about 0.05 and in other cases about 0.1.

The proportion of catalyst component (iii), the ionic activator, added to R1 is optimized by controlling the (ionic activator)/(bulky ligand-metal complex) molar ratio in the R1 solution; hereafter "R1 (iii)/(i)". The upper limit on R1 (iii)/(i) may be about 10, in some cases about 5 and in other cases about 2. The lower limit on R1 (iii)/(i) may be about 0.1, in some cases about 0.5 and in other cases about 1.0. The proportion of catalyst component (ii) is optimized by controlling the (alumoxane)/(bulky ligand-metal complex) molar ratio in the R1 solution; hereafter "R1 (ii)/(i)". The alumoxane co-catalyst is generally added in a molar excess relative to the bulky ligand-metal complex. The upper limit on R1 (ii)/(i) may be about 1000, in some cases about 500 and is other cases about 200. The lower limit on R1 (ii)/(i) may be about 1, in some cases about 10 and in other cases about 30.

The addition of catalyst component (iv), the hindered phenol, to R1 is optional in the embodiments shown in FIGS. 1-2. If added, the proportion of component (iv) is optimized by controlling the (hindered phenol)/(alumoxane) molar ratio in R1; hereafter "R1 (iv)/(ii)". The upper limit on R1 (iv)/(ii) may be about 10, in some cases about 5 and in other cases about 2. The lower limit on R1 (iv)/(ii) may be 0.0, in some cases about 0.1 and in other cases about 0.2. The addition of catalyst component (iv) to R2 is not optional in the comparative solution process, Process A, shown in FIG. 3. The proportion of component (iv) is optimized by controlling the (hindered phenol)/(alumoxane) molar ratio in R2; hereafter "R2 (iv)/(ii)". The upper limit on R2 (iv)/(ii) may be about 10, in some cases about 5 and in other cases about 2; the lower limit on R2 (iv)/(ii) may be 0.01, in some cases about 0.1 and in other cases about 0.2.

Any combination of the single site catalyst component streams in FIGS. 1 and 2 (streams 5a-5e) may, or may not, be heated or cooled. The upper limit on catalyst component stream temperatures may be about 70° C.; in other cases about 60° C. and in still other cases about 50° C. The lower limit on catalyst component stream temperatures may be about 0° C.; in other cases about 20° C. and in still other cases about 40° C. In this disclosure, a single site catalyst formulation is prepared having "a first catalyst solution temperature", or "CST-1". Referring to embodiments shown in FIGS. 1 and 2, CST-1 is the temperature of process stream 5e. The flow rate through process stream 5e can vary over a wide range, e.g., depending on catalyst activity and reactor volume. In this disclosure, the flow rate through process stream 5e is expressed as a percent of the total amount of process solvent exiting R1: the upper limit on the flow rate through process stream 5e may be about 20%, in other cases about 15% and in still other cases about 10% of the total amount of process solvent exiting R1; the lower limit on the flow rate through process stream 5e may be about 0.01%, in other cases about 0.05% and in still other cases about 0.1% of the total process solvent exiting R1.

Additional Solution Polymerization Process Parameters

In the continuous solution processes embodiments shown in FIGS. 1 and 2 that produce an ethylene interpolymer having improved color, a variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene and 1-octene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g., pentane, methyl pentane, hexane, heptane, octane, cyclohexane, methylcyclohexane, hydrogenated naphtha or combinations thereof. Non-limiting examples of aromatic catalyst component solvents include benzene, toluene (methylbenzene), ethylbenzene, o-xylene(1,2-dimethylbenzene), m-xylene(1,3-dimethylbenzene), p-xylene(1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

It is well known to individuals experienced in the art that reactor feed streams (solvent, monomer, α-olefin, hydrogen, catalyst formulation etc.) must be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

Referring to the first and second reactors in FIGS. 1 and 2 any combination of the CSTR reactor feed streams may be heated or cooled: more specifically, streams 1-4 (reactor 11a) and streams 6-9 (reactor 12a). The upper limit on reactor feed stream temperatures may be about 90° C.; in other cases about 80° C. and in still other cases about 70° C. The lower limit on reactor feed stream temperatures may be about 0° C.; in other cases about 10° C. and in still other cases about 20° C.

Any combination of the streams feeding the tubular reactor may be heated or cooled; specifically, streams 13-16 in FIGS. 1 and 2. In some cases, tubular reactor feed streams are tempered, i.e., the tubular reactor feed streams are heated to at least above ambient temperature. The upper temperature limit on the tubular reactor feed streams in some cases are about 200° C., in other cases about 170° C. and in still other cases about 140° C.; the lower temperature limit on the tubular reactor feed streams in some cases are about 60° C., in other cases about 90° C. and in still other cases about 120° C.; with the proviso that the temperature of the tubular reactor feed streams are lower than the temperature of the process stream that enters the tubular reactor.

In the embodiments shown in FIGS. 1 and 2 the operating temperatures of the solution polymerization reactors (vessels 11a (R1) and 12a (R2)) can vary over a wide range. For example, the upper limit on reactor temperatures in some cases may be about 300° C., in other cases about 280° C. and in still other cases about 260° C.; and the lower limit in some cases may be about 80° C., in other cases about 100° C. and in still other cases about 125° C. The second reactor, reactor 12a (R2), is operated at a higher temperature than the first reactor 11a (R1). The maximum temperature difference between these two reactors ($TR^2-TR^1$) in some cases is about 120° C., in other cases about 100° C. and in still other cases about 80° C.; the minimum ($TR^2-TR^1$) in some cases is about 1° C., in other cases about 5° C. and in still other cases about 10° C. The optional tubular reactor, reactor 17 (R3), may be operated in some cases about 100° C. higher than R2; in other cases about 60° C. higher than R2, in still other cases about 10° C. higher than R2 and in alternative cases 0° C. higher, i.e., the same temperature as R2. The temperature within optional R3 may increase along its length. The maximum temperature difference between the inlet and outlet of R3 in some cases is about 100° C., in other cases about 60° C. and in still other cases about 40° C. The minimum temperature difference between the inlet and outlet of R3 is in some cases may be 0° C., in other cases about 3° C. and in still other cases about 10° C. In some cases R3 is operated an adiabatic fashion and in other cases R3 is heated.

The pressure in the polymerization reactors should be high enough to maintain the polymerization solution as a single phase solution and to provide the upstream pressure to force the polymer solution from the reactors through a heat exchanger and on to polymer recovery operations. Referring to the embodiments shown in FIGS. 1 and 2, the operating pressure of the solution polymerization reactors can vary over a wide range. For example, the upper limit on reactor pressure in some cases may be about 45 MPag, in other cases about 30 MPag and in still other cases about 20 MPag; and the lower limit in some cases may be about 3 MPag, in other some cases about 5 MPag and in still other cases about 7 MPag.

Referring to the embodiments shown in FIGS. 1 and 2, prior to entering the first V/L separator, the passivated solution (stream 23) may have a maximum temperature in some cases of about 300° C., in other cases about 290° C. and in still other cases about 280° C.; the minimum temperature may be in some cases about 150° C., in other cases about 200° C. and in still other cases about 220° C. Immediately prior to entering the first V/L separator the passivated solution in some cases may have a maximum pressure of about 40 MPag, in other cases about 25 MPag and in still cases about 15 MPag; the minimum pressure in some cases may be about 1.5 MPag, in other cases about 5 MPag and in still other cases about 6 MPag.

The first V/L separator (vessel 25 in FIGS. 1 and 2) may be operated over a relatively broad range of temperatures and pressures. For example, the maximum operating temperature of the first V/L separator in some cases may be about 300° C., in other cases about 285° C. and in still other cases about 270° C.; the minimum operating temperature in some cases may be about 100° C., in other cases about 140° C. and in still other cases 170° C. The maximum operating pressure of the first V/L separator in some cases may be about 20 MPag, in other cases about 10 MPag and in still other cases about 5 MPag; the minimum operating pressure in some cases may be about 1 MPag, in other cases about 2 MPag and in still other cases about 3 MPag.

The second V/L separator (vessel 28 in FIGS. 1 and 2) may be operated over a relatively broad range of temperatures and pressures. For example, the maximum operating temperature of the second V/L separator in some cases may be about 300° C., in other cases about 250° C. and in still other cases about 200° C.; the minimum operating temperature in some cases may be about 100° C., in other cases about 125° C. and in still other cases about 150° C. The maximum operating pressure of the second V/L separator in some cases may be about 1000 kPag, in other cases about 900 kPag and in still other cases about 800 kPag; the minimum operating pressure in some cases may be about 10 kPag, in other cases about 20 kPag and in still other cases about 30 kPag.

The third V/L separator (vessel 31 in FIGS. 1 and 2) may be operated over a relatively broad range of temperatures and pressures. For example, the maximum operating temperature of the third V/L separator in some cases may be about 300° C., in other cases about 250° C., and in still other cases about 200° C.; the minimum operating temperature in some cases may be about 100° C., in other cases about 125° C. and in still other cases about 150° C. The maximum operating pressure of the third V/L separator in some cases may be about 500 kPag, in other cases about 150 kPag and in still other cases about 100 kPag; the minimum operating pressure in some cases may be about 1 kPag, in other cases about 10 kPag and in still other cases about 25 kPag.

Embodiments of the continuous solution polymerization process shown in FIGS. 1 and 2 show three V/L separators. However, continuous solution polymerization embodiments may include configurations comprising at least one V/L separator.

The ethylene interpolymer products having improved color produced in the continuous solution polymerization process may be recovered using conventional devolatilization systems that are well known to persons skilled in the art, non-limiting examples include flash devolatilization systems and devolatilizing extruders.

Any reactor shape or design may be used for reactor 11a (R1) and reactor 12a (R2) in FIGS. 1 and 2; non-limiting examples include unstirred or stirred spherical, cylindrical or tank-like vessels, as well as tubular reactors or recirculating loop reactors. At commercial scale the maximum volume of R1 in some cases may be about 20,000 gallons (about 75,710 L), in other cases about 10,000 gallons (about 37,850 L) and in still other cases about 5,000 gallons (about 18,930 L). At commercial scale the minimum volume of R1 in some cases may be about 100 gallons (about 379 L), in other cases about 500 gallons (about 1,893 L) and in still other cases about 1,000 gallons (about 3,785 L). At pilot plant scales reactor volumes are typically much smaller, for example the volume of R1 at pilot scale could be less than about 2 gallons (less than about 7.6 L). In this disclosure the volume of reactor R2 is expressed as a percent of the volume of reactor R1. The upper limit on the volume of R2 in some cases may be about 600% of R1, in other cases about 400% of R1 and in still other cases about 200% of R1. For clarity, if the volume of R1 is 5,000 gallons and R2 is 200% the volume of R1, then R2 has a volume of 10,000 gallons. The lower limit on the volume of R2 in some cases may be about 50% of R1, in other cases about 100% of R1 and in still other cases about 150% of R1. In the case of continuously stirred tank reactors the stirring rate can vary over a wide range; in some cases from about 10 rpm to about 2000 rpm, in other cases from about 100 to about 1500 rpm and in still other cases from about 200 to about 1300 rpm. In this disclosure the volume of R3, the tubular reactor, is expressed as a percent of the volume of reactor R2. The upper limit on the volume of R3 in some cases may be about 500% of R2, in other cases about 300% of R2 and in still other cases about 100% of R2. The lower limit on the volume of R3 in some cases may be about 3% of R2, in other cases about 10% of R2 and in still other cases about 50% of R2.

The "average reactor residence time", a commonly used parameter in the chemical engineering art, is defined by the first moment of the reactor residence time distribution; the reactor residence time distribution is a probability distribution function that describes the amount of time that a fluid element spends inside the reactor. The average reactor residence time can vary widely depending on process flow rates and reactor mixing, design and capacity. The upper limit on the average reactor residence time of the solution in R1 in some cases may be about 600 seconds, in other cases about 360 seconds and in still other cases about 180 seconds. The lower limit on the average reactor residence time of the solution in R1 in some cases may be about 10 seconds, in other cases about 20 seconds and in still other cases about 40 seconds. The upper limit on the average reactor residence time of the solution in R2 in some cases may be about 720 seconds, in other cases about 480 seconds and in still other cases about 240 seconds. The lower limit on the average reactor residence time of the solution in R2 in some cases may be about 10 seconds, in other cases about 30 seconds and in still other cases about 60 seconds. The upper limit on the average reactor residence time of the solution in R3 in some cases may be about 600 seconds, in other cases about 360 seconds and in still other cases about 180 seconds. The lower limit on the average reactor residence time of the solution in R3 in some cases may be about 1 second, in other cases about 5 seconds and in still other cases about 10 seconds.

Optionally, additional reactors (e.g., CSTRs, loops or tubes, etc.) could be added to the continuous solution polymerization process embodiments shown in FIGS. 1 and 2. In this disclosure, the number of reactors is not particularly important; with the proviso that the continuous solution polymerization process comprises at least two reactors that employ at least one single-site catalyst formulation and at least one heterogeneous catalyst formulation.

In operating the continuous solution polymerization process embodiments shown in FIGS. 1 and 2 the total amount of ethylene supplied to the process can be portioned or split between the three reactors R1, R2 and R3. This operational variable is referred to as the Ethylene Split (ES), i.e., "$ES^{R1}$", "$ES^{R2}$" and "$ES^{R3}$" refer to the weight percent of ethylene injected in R1, R2 and R3, respectively; with the proviso that $ES^{R1}+ES^{R2}+ES^{R3}=100\%$. This is accomplished by adjusting the ethylene flow rates in the following streams: stream 2 (R1), stream 7 (R2) and stream 14 (R3). The upper limit on $ES^{R1}$ in some cases is about 60%, in other cases about 55% and in still other cases about 50%; the lower limit on $ES^{R3}$ in some cases is about 10%, in other cases about 15% and in still other cases about 20%. The upper limit on $ES^{R2}$ in some cases is about 90%, in other cases about 80% and in still other cases about 70%; the lower limit on $ES^{R2}$ in some cases is about 20%, in other cases about 30% and in still other cases about 40%. The upper limit on $ES^{R3}$ in some cases is about 30%, in other cases about 25% and in still other cases about 20%; the lower limit on $ES^{R3}$ in some cases is 0%, in other cases about 5% and in still other cases about 10%.

In operating the continuous solution polymerization process embodiments shown in FIGS. 1 and 2 the ethylene concentration in each reactor is also controlled. The R1 ethylene concentration is defined as the weight of ethylene in reactor 1 divided by the total weight of everything added to reactor 1; the R2 ethylene concentration (wt %) and R3 ethylene concentration (wt %) are defined similarly. Ethylene concentrations in the reactors in some cases may vary from about 7 weight percent (wt %) to about 25 wt %, in other cases from about 8 wt % to about 20 wt % and in still other cases from about 9 wt % to about 17 wt %.

In operating the continuous solution polymerization process embodiments shown in FIGS. 1 and 2 that produce ethylene interpolymers having improved color, the total amount of ethylene converted in each reactor is monitored. The term refers to the percent of the ethylene added to R1 that is converted into an ethylene interpolymer by the catalyst formulation. Similarly $Q^{R2}$ and $Q^{R3}$ represent the percent of the ethylene added to R2 and R3 that was converted into ethylene interpolymer, in the respective reactor. Ethylene conversions can vary significantly depending on a variety of process conditions, e.g., catalyst concentration, catalyst formulation, impurities and poisons. The upper limit on both $Q^{R1}$ and $Q^{R2}$ in some cases is about 99%, in other cases about 95% and in still other cases about 90%; the lower limit on both $Q^{R1}$ and $Q^{R2}$ in some cases is about 65%, in other cases about 70% and in still other cases about 75%. The upper limit on $Q^{R3}$ in some cases is about 99%, in other cases about 95% and in still other cases about 90%; the lower limit on $Q^{R3}$ in some cases is 0%, in other cases about 5% and in still other cases about 10%. The term "QT" represents the total or overall ethylene conversion across the entire continuous solution polymerization plant; i.e., $Q^T=100\times$[weight of ethylene in the interpolymer product]/ ([weight of ethylene in the interpolymer product]+[weight of unreacted ethylene]). The upper limit on QT in some cases is about 99%, in other cases about 95% and in still other cases about 90%; the lower limit on $Q^T$ in some cases is about 75%, in other cases about 80% and in still other cases about 85%.

Optionally, α-olefin may be added to the continuous solution polymerization process. If added, α-olefin may be proportioned or split between R1, R2 and R3. This operational variable is referred to as the Comonomer Split (CS), i.e., "$CS^{R1}$", "$CS^{R2}$" and "$CS^{R3}$" refer to the weight percent of α-olefin comonomer that is injected in R1, R2 and R3, respectively; with the proviso that $CS^{R1}+CS^{R2}+CS^{R3}=100\%$. This is accomplished by adjusting α-olefin flow rates in the following streams: stream 3 (R1), stream 8 (R2) and stream 15 (R3). The upper limit on $CS^{R1}$ in some cases is 100% (i.e., 100% of the α-olefin is injected into R1), in other cases about 95% and in still other cases about 90%. The lower limit on $CS^{R1}$ in some cases is 0% (ethylene homopolymer produced in R1), in other cases about 5% and in still other cases about 10%. The upper limit on $CS^{R2}$ in some cases is about 100% (i.e. 100% of the α-olefin is injected into reactor 2), in other cases about 95% and in still other cases about 90%. The lower limit on $CS^{R2}$ in some cases is 0%, in other cases about 5% and in still other cases about 10%. The upper limit on $CS^{R3}$ in some cases is 100%, in other cases about 95% and in still other cases about 90%. The lower limit on $CS^{R3}$ in some cases is 0%, in other cases about 5% and in still other cases about 10%.

Catalyst Deactivation

In the continuous polymerization processes described in this disclosure, polymerization is terminated by adding a catalyst deactivator. Embodiments in FIGS. 1 and 2 show catalyst deactivation occurring either: (a) upstream of the tubular reactor by adding a catalyst deactivator A from catalyst deactivator tank 18A, or; (b) downstream of the tubular reactor by adding a catalyst deactivator B from catalyst deactivator tank 18B. Catalyst deactivator tanks 18A and 18B may contain neat (100%) catalyst deactivator, a solution of catalyst deactivator in a solvent, or a slurry of catalyst deactivator in a solvent. The chemical composition of catalyst deactivator A and B may be the same, or different. Non-limiting examples of suitable solvents include linear or branched $C_5$ to $C_{12}$ alkanes. In this disclosure, how the catalyst deactivator is added is not particularly important. Once added, the catalyst deactivator substantially stops the polymerization reaction by changing active catalyst species to inactive forms. Suitable deactivators are well known in the art, non-limiting examples include: amines (e.g., U.S. Pat. No. 4,803,259 to Zboril et al.); alkali or alkaline earth metal salts of carboxylic acid (e.g., U.S. Pat. No. 4,105,609 to Machan et al.); water (e.g., U.S. Pat. No. 4,731,438 to Bernier et al.); hydrotalcites, alcohols and carboxylic acids (e.g., U.S. Pat. No. 4,379,882 to Miyata); or a combination thereof (e.g., U.S. Pat. No. 6,180,730 to Sibtain et al.). Carboxylic acids that are suitable as catalyst deactivators include: $RCO_2H$, where R is a linear or branched hydrocarbyl group containing 5 to 20 carbon atoms. In this disclosure the quantify of catalyst deactivator added was determined by the following catalyst deactivator molar ratio: 0.3≤(catalyst deactivator)/((total catalytic metal)+(alkyl aluminum co-catalyst)+(aluminum alkyl))≤2.0; where the catalytic metal is the total moles of (metal A+metal B+optional metal C). The upper limit on the catalyst deactivator molar ratio may be about 2, in some cases about 1.5 and in other cases about 0.75. The lower limit on the catalyst deactivator molar ratio may be about 0.3, in some cases about 0.35 and in still other cases about 0.4. In general, the catalyst deactivator is added in a minimal amount such that the catalyst is deactivated and the polymerization reaction is quenched.

Solution Passivation

Referring to the embodiments shown in FIGS. 1 and 2; prior to entering the first V/L separator, a passivator or acid scavenger is added to deactivated solution A or B to form a passivated solution, i.e., passivated solution stream 23. Passivator tank 22 may contain neat (100%) passivator, a solution of passivator in a solvent, or a slurry of passivator in a solvent. Non-limiting examples of suitable solvents include linear or branched $C_5$ to $C_{12}$ alkanes. In this disclosure, how the passivator is added is not particularly important. Suitable passivators are well known in the art, non-limiting examples include alkali or alkaline earth metal salts of carboxylic acids or hydrotalcites. The quantity of passivator added can vary over a wide range. In this disclosure the molar quantity of passivator added was determined by the total moles of chloride compounds added to the solution process, i.e., the chloride compound "component (vi)" plus the metal compound "compound (vii)". Optionally, a first and second chloride compound and a first and second metal compound may be used, i.e., to form the first and second heterogeneous catalyst formulations; in this case the amount of passivator added is determined by the total moles all chloride containing compounds. The upper limit on passivator mole ratio (moles passivator)/(total chlorides) molar ratio may be 20, in some cases 15 and in other cases 10. The lower limit on the (passivator)/(total chlorides) molar ratio may be about 0.2, in some cases about 0.4 and in still other cases about 0.8. In general, the passivator is added in the minimal amount to substantially passivate the deactivated solution.

First Ethylene Interpolymer

The first ethylene interpolymer is produced with a single-site catalyst formulation. Referring to the embodiments shown in FIGS. 1 and 2, if the optional α-olefin is not added to reactor 1 (R1), then the ethylene interpolymer produced in R1 is an ethylene homopolymer. If an α-olefin is added, the following weight ratio is one parameter to control the density of the first ethylene interpolymer: $((α\text{-olefin})/(\text{ethylene}))^{R1}$. The upper limit on $((α\text{-olefin})/(\text{ethylene}))^{R1}$ may be about 3; in other cases about 2 and in still other cases about 1. The lower limit on $((α\text{-olefin})/(\text{ethylene}))^{R1}$ may be 0; in other cases about 0.25 and in still other cases about 0.5. Hereafter, the symbol "$\sigma^1$" refers to the density of the first ethylene interpolymer produced in R1. The upper limit on al may be about 0.975 g/cm³; in some cases about 0.965 g/cm³ and; in other cases about 0.955 g/cm³. The lower limit on $\sigma^1$ may be about 0.855 g/cm³, in some cases about 0.865 g/cm³, and; in other cases about 0.875 g/cm³.

Methods to determine the $CDBI_{50}$ (Composition Distribution Branching Index) of an ethylene interpolymer are well known to those skilled in the art. The $CDBI_{50}$, expressed as a percent, is defined as the percent of the ethylene interpolymer whose comonomer composition is within 50% of the median comonomer composition. It is also well known to those skilled in the art that the $CDBI_{50}$ of ethylene interpolymers produced with single-site catalyst formulations are higher relative to the $CDBI_{50}$ of α-olefin containing ethylene interpolymers produced with heterogeneous catalyst formulations. The upper limit on the $CDBI_{50}$ of the first ethylene interpolymer (produced with a single-site catalyst formulation) may be about 98%, in other cases about 95% and in still other cases about 90%. The lower limit on the $CDBI_{50}$ of the first ethylene interpolymer may be about 70%, in other cases about 75% and in still other cases about 80%.

As is well known to those skilled in the art the $M_w/M_n$ of ethylene interpolymers produced with single site catalyst formulations are lower relative to ethylene interpolymers produced with heterogeneous catalyst formulations. Thus, in the embodiments disclosed, the first ethylene interpolymer has a lower $M_w/M_n$ relative to the second ethylene interpolymer; where the second ethylene interpolymer is produced with a heterogeneous catalyst formulation. The upper limit on the $M_w/M_n$ of the first ethylene interpolymer may be about 2.8, in other cases about 2.5 and in still other cases about 2.2. The lower limit on the $M_w/M_n$ the first ethylene interpolymer may be about 1.7, in other cases about 1.8 and in still other cases about 1.9.

The first ethylene interpolymer contains catalyst residues that reflect the chemical composition of the single-site catalyst formulation used. Those skilled in the art will understand that catalyst residues are typically quantified by the parts per million of metal in the first ethylene interpolymer, where metal refers to the metal in component (i), i.e. the metal in the "bulky ligand-metal complex"; hereafter this metal will be referred to "metal A". As recited earlier in this disclosure, non-limiting examples of metal A include Group 4 metals, titanium, zirconium and hafnium. The upper limit on the ppm of metal A in the first ethylene interpolymer may be about 1.0 ppm, in other cases about 0.9 ppm and in still other cases about 0.8 ppm. The lower limit on the ppm of metal A in the first ethylene interpolymer may be about 0.01 ppm, in other cases about 0.1 ppm and in still other cases about 0.2 ppm.

The amount of hydrogen added to R1 can vary over a wide range allowing the continuous solution process to produce first ethylene interpolymers that differ greatly in melt index, hereafter $I_2^1$ (melt index is measured at 190° C. using a 2.16 kg load following the procedures outlined in ASTM D1238). This is accomplished by adjusting the hydrogen flow rate in stream 4 (as shown in FIGS. 1 and 2). The quantity of hydrogen added to R1 is expressed as the parts-per-million (ppm) of hydrogen in R1 relative to the total mass in reactor R1; hereafter $H_2^R1$ (ppm). In some cases $H_2^R1$ (ppm) ranges from about 50 ppm to 0 ppm, in other cases from about 25 ppm to 0 ppm, in alternative cases from about 10 to 0 and in still other cases from about 2 ppm to 0 ppm. The upper limit on $I_2^1$ may be about 200 dg/min, in some cases about 100 dg/min; in other cases about 50 dg/min, and; in still other cases about 1 dg/min. The lower limit on $I_2^1$ may be about 0.01 dg/min, in some cases about 0.05 dg/min; in other cases about 0.1 dg/min, and; in still other cases about 0.5 dg/min.

The upper limit on the weight percent (wt %) of the first ethylene interpolymer in the ethylene interpolymer product may be about 60 wt %, in other cases about 55 wt % and in still other cases about 50 wt %. The lower limit on the wt % of the first ethylene interpolymer in the ethylene interpolymer product may be about 15 wt %; in other cases about 25 wt % and in still other cases about 30 wt %.

Second Ethylene Interpolymer

Referring to the embodiments shown in FIG. 1, if optional α-olefin is not added to reactor 12a (R2) either through fresh α-olefin stream 8 or carried over from reactor 11a (R1) in stream 11e (in series mode), then the ethylene interpolymer produced in reactor 12a (R2) is an ethylene homopolymer. If an optional α-olefin is present in R2, the following weight ratio is one parameter to control the density of the second ethylene interpolymer produced in R2: $((\alpha\text{-olefin})/(\text{ethylene}))^{R2}$. The upper limit on $((\alpha\text{-olefin})/(\text{ethylene}))^{R2}$ may be about 3; in other cases about 2 and in still other cases about 1. The lower limit on $((\alpha\text{-olefin})/(\text{ethylene}))^{R2}$ may be 0; in other cases about 0.25 and in still other cases about 0.5. Hereafter, the symbol "$\sigma^2$" refers to the density of the ethylene interpolymer produced in R2. The upper limit on $\sigma^2$ may be about 0.975 g/cm³; in some cases about 0.965 g/cm³ and; in other cases about 0.955 g/cm³. Depending on the heterogeneous catalyst formulation used, the lower limit on $\sigma^2$ may be about 0.89 g/cm³, in some cases about 0.90 g/cm³, and; in other cases about 0.91 g/cm³. The ranges disclosed in this paragraph also apply to the embodiments shown in FIG. 2.

A heterogeneous catalyst formulation is used to produce the second ethylene interpolymer. If the second ethylene interpolymer contains an α-olefin, the $CDBI_{50}$ of the second ethylene interpolymer is lower relative to the $CDBI_{50}$ of the first ethylene interpolymer that was produced with a single-site catalyst formulation. In an embodiment of this disclosure, the upper limit on the $CDBI_{50}$ of the second ethylene interpolymer (that contains an α-olefin) may be about 70%, in other cases about 65% and in still other cases about 60%. In an embodiment of this disclosure, the lower limit on the $CDBI_{50}$ of the second ethylene interpolymer (that contains an α-olefin) may be about 45%, in other cases about 50% and in still other cases about 55%. If an α-olefin is not added to the continuous solution polymerization process the second ethylene interpolymer is an ethylene homopolymer. In the case of a homopolymer, which does not contain α-olefin, one can still measure a $CDBI_{50}$ using TREF. In the case of a homopolymer, the upper limit on the $CDBI_{50}$ of the second ethylene interpolymer may be about 98%, in other cases about 96% and in still other cases about 95%, and; the lower limit on the $CDBI_{50}$ may be about 88%, in other cases about 89% and in still other cases about 90%. It is well known to those skilled in the art that as the α-olefin content in the second ethylene interpolymer approaches zero, there is a smooth transition between the recited $CDBI_{50}$ limits for the second ethylene interpolymers (that contain an α-olefin) and the recited $CDBI_{50}$ limits for the second ethylene interpolymers that are ethylene homopolymers. Typically, the $CDBI_{50}$ of the first ethylene interpolymer is higher than the $CDBI_{50}$ of the second ethylene interpolymer.

The $M_w/M_n$ of second ethylene interpolymer is higher than the $M_w/M_n$ of the first ethylene interpolymer. The upper limit on the $M_w/M_n$ of the second ethylene interpolymer may be about 4.4, in other cases about 4.2 and in still other cases about 4.0. The lower limit on the $M_w/M_n$ of the second ethylene interpolymer may be about 2.2. $M_w/M_n$'s of 2.2 are observed when the melt index of the second ethylene interpolymer is high, or when the melt index of the ethylene interpolymer product is high, e.g., greater than 10 dg/minute. In other cases the lower limit on the $M_w/M_n$ of the second ethylene interpolymer may be about 2.4 and in still other cases about 2.6.

The second ethylene interpolymer contains catalyst residues that reflect the chemical composition of heterogeneous catalyst formulation. Those skilled in the art with understand that heterogeneous catalyst residues are typically quantified by the parts per million of metal in the second ethylene interpolymer, where the metal refers to the metal originating from component (vii), i.e., the "metal compound"; hereafter this metal will be referred to as "metal B". As recited earlier in this disclosure, non-limiting examples of metal B include metals selected from Group 4 through Group 8 of the Periodic Table, or mixtures of metals selected from Group 4 through Group 8. The upper limit on the ppm of metal B in the second ethylene interpolymer may be about 12 ppm, in other cases about 10 ppm and in still other cases about 8 ppm. The lower limit on the ppm of metal B in the second ethylene interpolymer may be about 1 ppm, in other cases about 2 ppm and in still other cases about 3 ppm. While not wishing to be bound by any particular theory, in series mode of operation it is believed that the chemical environment within the second reactor deactivates the single site catalyst formulation, or; in parallel mode of operation the chemical environment within stream 12d deactivates the single site catalyst formation.

Referring to the embodiments shown in FIGS. 1 and 2, the amount of hydrogen added to R2 can vary over a wide range which allows the continuous solution process to produce second ethylene interpolymers that differ greatly in melt index, hereafter $I_2^2$. This is accomplished by adjusting the hydrogen flow rate in stream 9. The quantity of hydrogen added is expressed as the parts-per-million (ppm) of hydrogen in R2 relative to the total mass in reactor R2; hereafter $H_2^R2$ (ppm). In some cases $H_2^R2$ (ppm) ranges from about 100 ppm to 0 ppm, in some cases from about 50 ppm to 0 ppm, in other cases from about 20 ppm to 0 ppm and in still other cases from about 2 ppm to 0 ppm. The upper limit on $I_2^2$ may be about 1000 dg/min; in some cases about 750 dg/min; in other cases about 500 dg/min, and; in still other cases about 200 dg/min. The lower limit on $I_2^2$ may be about 0.3 dg/min, in some cases about 0.4 dg/min, in other cases about 0.5 dg/min, and; in still other cases about 0.6 dg/min.

The upper limit on the weight percent (wt %) of the second ethylene interpolymer in the ethylene interpolymer product may be about 85 wt %, in other cases about 80 wt % and in still other cases about 70 wt %. The lower limit on the wt % of the second ethylene interpolymer in the ethylene interpolymer product may be about 30 wt %; in other cases about 40 wt % and in still other cases about 50 wt %.

Third Ethylene Interpolymer

Referring to the embodiments shown in FIG. 1 a third ethylene interpolymer is not produced in reactor 17 (R3) if catalyst deactivator A is added upstream of reactor 17 via catalyst deactivator tank 18A. If catalyst deactivator A is not added and optional α-olefin is not added to reactor 17 either through fresh α-olefin stream 15 or carried over from reactor 12a (R2) in stream 12c (series mode) or stream 12d (parallel mode) then the ethylene interpolymer produced in reactor 17 is an ethylene homopolymer. If catalyst deactivator A is not added and optional α-olefin is present in R3, the following weight ratio determines the density of the third ethylene interpolymer: $((\alpha\text{-olefin})/(\text{ethylene}))^{R3}$. In the continuous solution polymerization process $((\alpha\text{-olefin})/(\text{ethylene}))^{R3}$ is one of the control parameter used to produce a third ethylene interpolymer with a desired density. The upper limit on $((\alpha\text{-olefin})/(\text{ethylene}))^{R3}$ may be about 3; in other cases about 2 and in still other cases about 1. The lower limit on $((\alpha\text{-olefin})/(\text{ethylene}))R^3$ may be 0; in other cases about 0.25 and in still other cases about 0.5. Hereafter, the symbol "$\sigma^3$" refers to the density of the ethylene interpolymer produced in R3. The upper limit on $\sigma^3$ may be about 0.975 g/cm³; in some cases about 0.965 g/cm³ and; in other cases about 0.955 g/cm³. Depending on the heterogeneous catalyst formulations used, the lower limit on $\sigma^3$ may be about 0.89 g/cm³, in some cases about 0.90 g/cm³, and; in other cases about 0.91 g/cm³. Optionally, a second heterogeneous catalyst formulation may be added to R3. The ranges disclosed in this paragraph also apply to the embodiments shown in FIG. 2.

Typically, the upper limit on the $CDBI_{50}$ of the optional third ethylene interpolymer (containing an α-olefin) may be about 65%, in other cases about 60% and in still other cases about 55%. The $CDBI_{50}$ of an α-olefin containing optional third ethylene interpolymer will be lower than the $CDBI_{50}$ of the first ethylene interpolymer produced with the single-site catalyst formulation. Typically, the lower limit on the $CDBI_{50}$ of the optional third ethylene interpolymer (containing an α-olefin) may be about 35%, in other cases about 40% and in still other cases about 45%. If an α-olefin is not added to the continuous solution polymerization process the optional third ethylene interpolymer is an ethylene homopolymer. In the case of an ethylene homopolymer, the upper limit on the $CDBI_{50}$ may be about 98%, in other cases about 96% and in still other cases about 95%, and; the lower limit on the $CDBI_{50}$ may be about 88%, in other cases about 89% and in still other cases about 90%. Typically, the $CDBI_{50}$ of the first ethylene interpolymer is higher than the $CDBI_{50}$ of the third ethylene interpolymer and second ethylene interpolymer.

The upper limit on the $M_w/M_n$ of the optional third ethylene interpolymer may be about 5.0, in other cases about 4.8 and in still other cases about 4.5. The lower limit on the $M_w/M_n$ of the optional third ethylene interpolymer may be about 2.2, in other cases about 2.4 and in still other cases about 2.6. The $M_w/M_n$ of the optional third ethylene interpolymer is higher than the $M_w/M_n$ of the first ethylene interpolymer. When blended together, the second and third ethylene interpolymer have a fourth $M_w/M_n$ which is not broader than the $M_w/M_n$ of the second ethylene interpolymer.

The catalyst residues in the optional third ethylene interpolymer reflect the chemical composition of the heterogeneous catalyst formulation(s) used, i.e., the first and optionally a second heterogeneous catalyst formulation. The chemical compositions of the first and second heterogeneous catalyst formulations may be the same or different; for example a first component (vii) and a second component (vii) may be used to synthesize the first and second heterogeneous catalyst formulation. As recited above, "metal B" refers to the metal that originates from the first component (vii). Hereafter, "metal C" refers to the metal that originates from the second component (vii). Metal B and optional metal C may be the same, or different. Non-limiting examples of metal B and metal C include metals selected from Group 4 through Group 8 of the Periodic Table, or mixtures of metals selected from Group 4 through Group 8. The upper limit on the ppm of (metal B+metal C) in the optional third ethylene interpolymer may be about 12 ppm, in other cases about 10 ppm and in still other cases about 8 ppm. The lower limit on the ppm of (metal B+metal C) in the optional third ethylene interpolymer may be about 0.5 ppm, in other cases about 1 ppm and in still other cases about 3 ppm.

Referring to the embodiments shown in FIGS. 1 and 2, optional hydrogen may be added to the tubular reactor (R3) via stream 16. The amount of hydrogen added to R3 may vary over a wide range. Adjusting the amount of hydrogen in R3, hereafter $H_2^R3$ (ppm), allows the continuous solution process to produce optional third ethylene interpolymers that differ widely in melt index, hereafter $I_2^3$. The amount of optional hydrogen added to R3 ranges from about 50 ppm to 0 ppm, in some cases from about 25 ppm to 0 ppm, in other cases from about 10 to 0 and in still other cases from about 2 ppm to 0 ppm. The upper limit on $I_2^3$ may be about 2000 dg/min; in some cases about 1500 dg/min; in other cases about 1000 dg/min, and; in still other cases about 500 dg/min. The lower limit on $I_2^3$ may be about 0.5 dg/min, in some cases about 0.6 dg/min, in other cases about 0.7 dg/min, and; in still other cases about 0.8 dg/min.

The upper limit on the weight percent (wt %) of the optional third ethylene interpolymer in the ethylene interpolymer product may be about 30 wt %, in other cases about 25 wt % and in still other cases about 20 wt %. The lower limit on the wt % of the optional third ethylene interpolymer in the ethylene interpolymer product may be 0 wt %; in other cases about 5 wt % and in still other cases about 10 wt %.

Ethylene Interpolymer Product

The upper limit on the density of the ethylene interpolymer product may be about 0.975 g/cm$^3$; in some cases about 0.965 g/cm$^3$ and; in other cases about 0.955 g/cm$^3$. The lower limit on the density of the ethylene interpolymer product may be about 0.869 g/cm$^3$, in some cases about 0.879 g/cm$^3$, and; in other cases about 0.889 g/cm$^3$.

The upper limit on the CDBI$_{50}$ of the ethylene interpolymer product may be about 97%, in other cases about 90% and in still other cases about 85%. An ethylene interpolymer product with a CDBI$_{50}$ of 97% may result if an α-olefin is not added to the continuous solution polymerization process; in this case, the ethylene interpolymer product is an ethylene homopolymer. The lower limit on the CDBI$_{50}$ of an ethylene interpolymer may be about 20%, in other cases about 40% and in still other cases about 60%.

The upper limit on the M$_w$/M$_n$ of the ethylene interpolymer product may be about 25, in other cases about 15 and in still other cases about 9. The lower limit on the M$_w$/M$_n$ of the ethylene interpolymer product may be 2.0, in other cases about 2.2 and in still other cases about 2.4.

The catalyst residues in the ethylene interpolymer product reflect the chemical compositions of: the single-site catalyst formulation employed in R1; the first heterogeneous catalyst formulation employed in R2, and; optionally the first or optionally the first and second heterogeneous catalyst formulation employed in R3. In this disclosure, catalyst residues were quantified by measuring the parts per million of catalytic metal in the ethylene interpolymer products. In addition, the elemental quantities (ppm) of magnesium, chlorine and aluminum were quantified. Catalytic metals originate from two or optionally three sources, specifically: 1) "metal A" that originates from component (i) that was used to form the single-site catalyst formulation; (2) "metal B" that originates from the first component (vii) that was used to form the first heterogeneous catalyst formulation, and; (3) optionally "metal C" that originates from the second component (vii) that was used to form the optional second heterogeneous catalyst formulation. Metals A, B and C may be the same or different. In this disclosure the term "total catalytic metal" is equivalent to the sum of catalytic metals A+B+C. Further, in this disclosure the terms "first total catalytic metal" and "second total catalyst metal" are used to differentiate between the first ethylene interpolymer product of this disclosure and a comparative "polyethylene composition" that were produced using different catalyst formulations.

The upper limit on the ppm of metal A in the ethylene interpolymer product may be about 0.6 ppm, in other cases about 0.5 ppm and in still other cases about 0.4 ppm. The lower limit on the ppm of metal A in the ethylene interpolymer product may be about 0.001 ppm, in other cases about 0.01 ppm and in still other cases about 0.03 ppm. The upper limit on the ppm of (metal B+metal C) in the ethylene interpolymer product may be about 11 ppm, in other cases about 9 ppm and in still other cases about 7 ppm. The lower limit on the ppm of (metal B+metal C) in the ethylene interpolymer product may be about 1 ppm, in other cases about 2 ppm and in still other cases about 3 ppm.

In some embodiments, ethylene interpolymers may be produced where the catalytic metals (metal A, metal B and metal C) are the same metal; a non-limiting example would be titanium. In such embodiments, the ppm of (metal B+metal C) in the ethylene interpolymer product is calculated using equation (VII):

$$ppm^{(B+C)} = ((ppm^{(A+B+C)} - (f^A \times ppm^A))/(1-f^A)) \qquad (VII)$$

where: ppm$^{(B+C)}$ is the calculated ppm of (metal B+metal C) in the ethylene interpolymer product; ppm$^{(A+B+C)}$ is the total ppm of catalyst residue in the ethylene interpolymer product as measured experimentally, i.e., (metal A ppm+metal B ppm+metal C ppm); f$^A$ represents the weight fraction of the first ethylene interpolymer in the ethylene interpolymer product, f$^A$ may vary from about 0.15 to about 0.6, and; ppm$^A$ represents the ppm of metal A in the first ethylene interpolymer. In equation (VII) ppm$^A$ is assumed to be 0.35 ppm.

Embodiments of the ethylene interpolymer products disclosed herein have lower catalyst residues relative to the polyethylene polymers described in U.S. Pat. No. 6,277,931. Higher catalyst residues in U.S. Pat. No. 6,277,931 increase the complexity of the continuous solution polymerization process; an example of increased complexity includes additional purification steps to remove catalyst residues from the polymer. In contrast, in the present disclosure, catalyst residues are not removed. In this disclosure, the upper limit on the total ppm of catalyst residuals (metal A+metal B+optional metal C) in the ethylene interpolymer product may be about 12 ppm, in other cases about 9 ppm and in still other cases about 7, and; the lower limit on the total ppm of catalyst residuals (metal A+metal B+optional metal C) in the ethylene interpolymer product may be about 1 ppm, in other cases about 2 ppm and in still other cases about 3 ppm.

The upper limit on melt index of the ethylene interpolymer product may be about 500 dg/min, in some cases about 400 dg/min; in other cases about 300 dg/min, and; in still other cases about 200 dg/min. The lower limit on the melt index of the ethylene interpolymer product may be about 0.3 dg/min, in some cases about 0.4 dg/min; in other cases about 0.5 dg/min, and; in still other cases about 0.6 dg/min.

Table 9 summarizes a computer simulation of one embodiment of an ethylene interpolymer disclosed herein. Simulated Example 13, shown in Table 9, was based on the configuration of the solution pilot plant described in the experiment section of this disclosure. In Simulated Example 13 a single-site catalyst formulation (PIC-1) was used in R1 and an in-line Ziegler-Natta catalyst formulation was used in R2. Table 9 discloses a non-limiting example of the density, melt index and molecular weights of the first, second and third ethylene interpolymers produced in the three reactors (R1, R2 and R3); these three interpolymers are combined to produce Simulated Example 13 (the ethylene interpolymer product). To be clear, Simulated Example 13 has a density of 0.9169 g/cm$^3$, a melt index of 1.0 dg/min, a branch frequency of 12.1 (the number of C$_6$-branches per 1000 carbon atoms (1-octene comonomer)) and a M$_w$/M$_n$ of 3.11. The simulated production rate of Simulated Example 13 was 90.9 kg/hr and the R3 exit temperature was 217.1° C.

Ethylene Interpolymer Product Having Improved Color

Tables 1A through 1C summarize the continuous solution process conditions that were used to produce Examples 51-55 as well as Comparative Example 2. The production rate of Examples 51-55 were at least 17% higher relative to Comparative Example 2. In Examples 51-55 a single-site catalyst formulation and an in-line Ziegler-Natta catalyst formulation were used in reactors 1 and 2, respectively, such that ethylene interpolymer products were produced at maximum production rates of 94.4 to 98.5 kg/h. In contrast, in Comparative Example 2 a single-site catalyst formulation was used in both reactors 1 and 2 such that an ethylene interpolymer product was produced at 80.6 kg/hr. In Examples 51-55 and Comparative Example 2, reactors 1 and 2 were configured in series, i.e. the effluent from reactor 1 flowed directly into reactor 2.

In the experiments producing Examples 51-55 the "first Catalyst Solution Temperature, CST-1" and the "second Catalyst Solution Temperature, CST-2" were varied as shown in Table 1C; the R1 link line temperature also varied, i.e., the process line connecting R1 and R2. The objective of these experiments were to modify CST-1 and CST-2 while holding all other reaction parameters constant, e.g., solvent flows, ethylene concentrations, ethylene split (portion of ethylene to R1 and R2), octene/ethylene mole ratio, ethylene conversion, production rate, catalyst deactivator mole ratio, pacifier mole ratio and quantity of additives.

Figure 3:
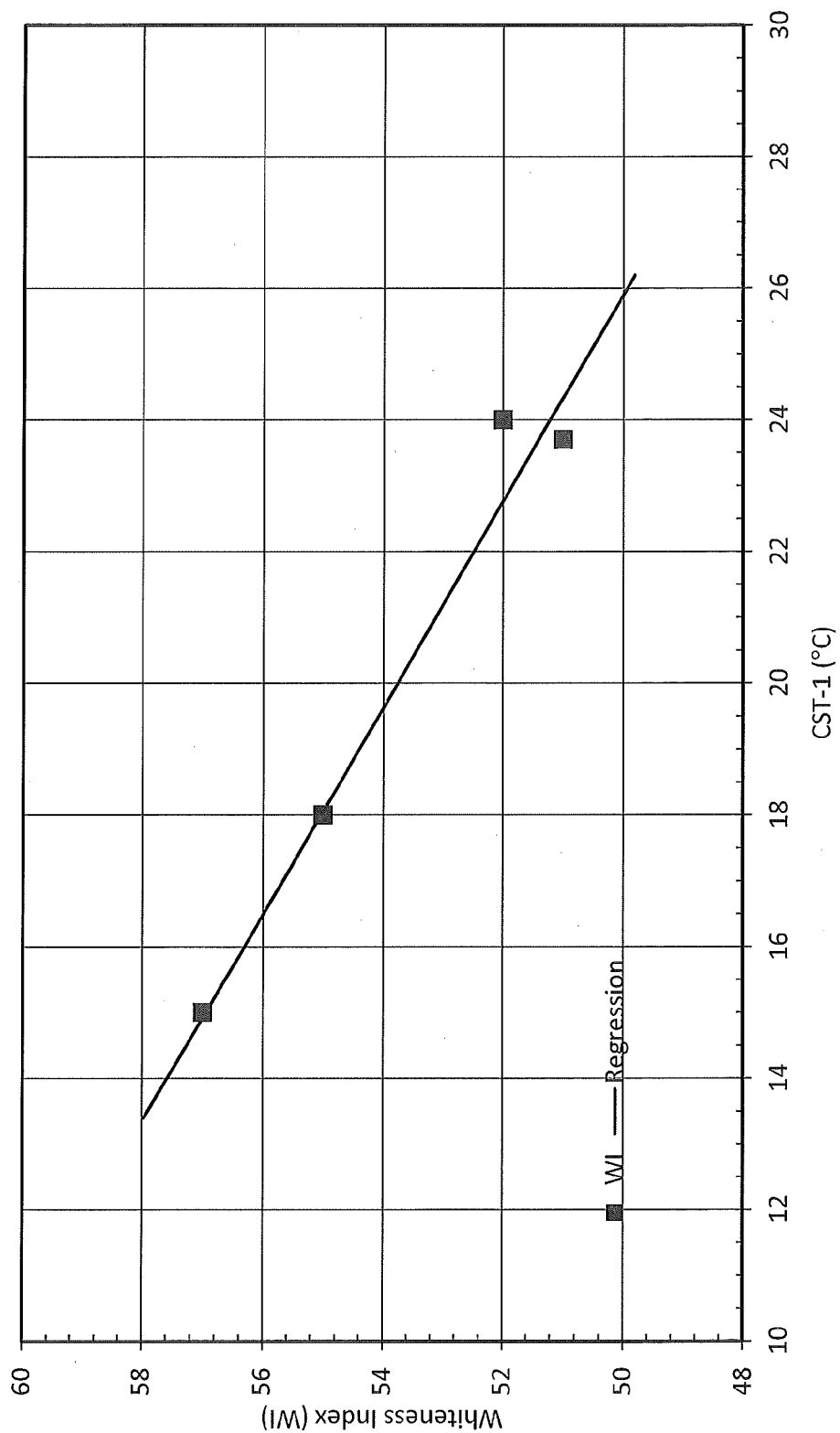
FIG. 3: Whiteness Index (WI) of ethylene interpolymer product as a function of Catalyst Solution Temperature CST-1.
Figure 4:
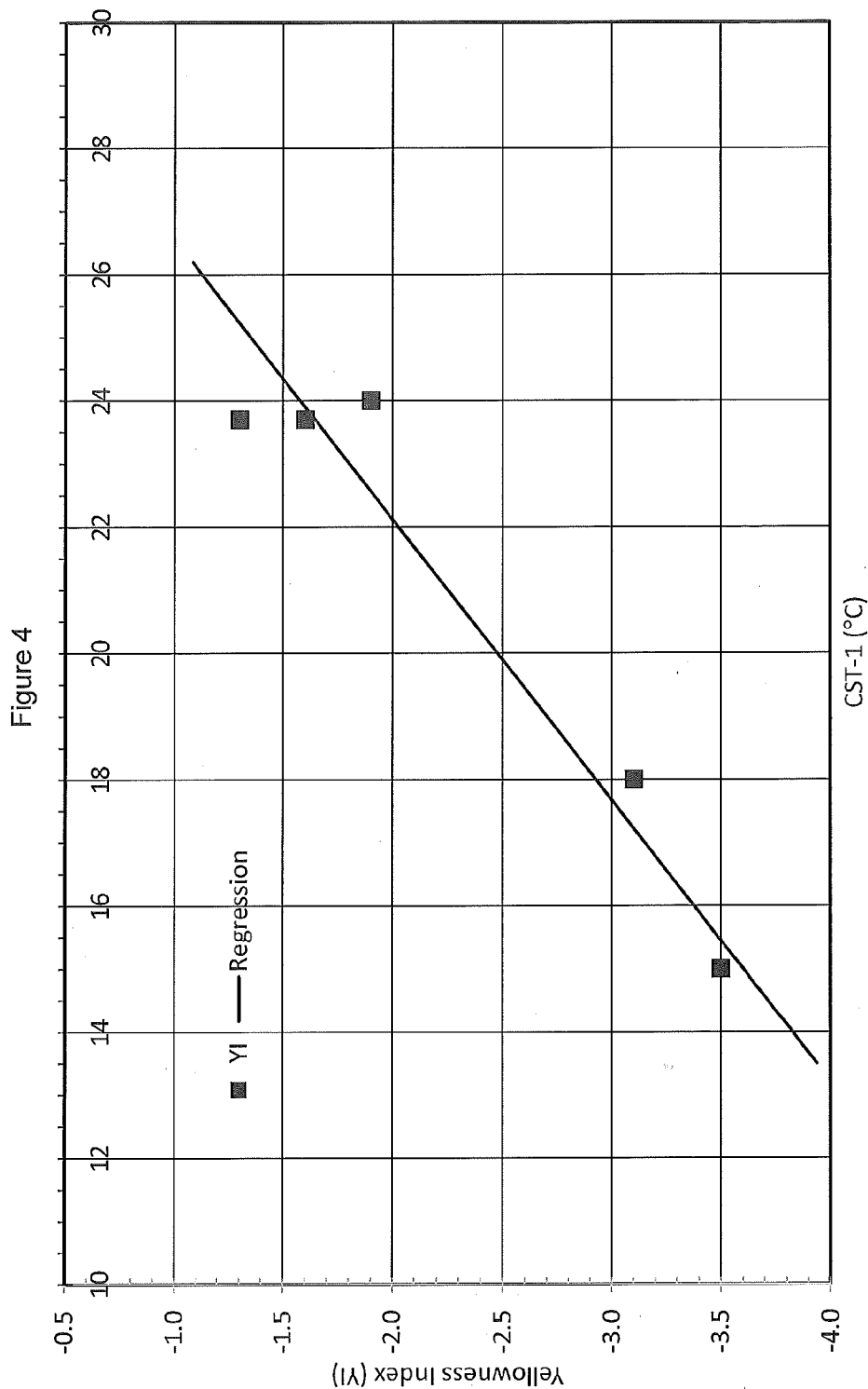
FIG. 4: Yellowness Index (YI) of ethylene interpolymer product as a function of Catalyst Solution Temperature CST-1.
Figure 5:
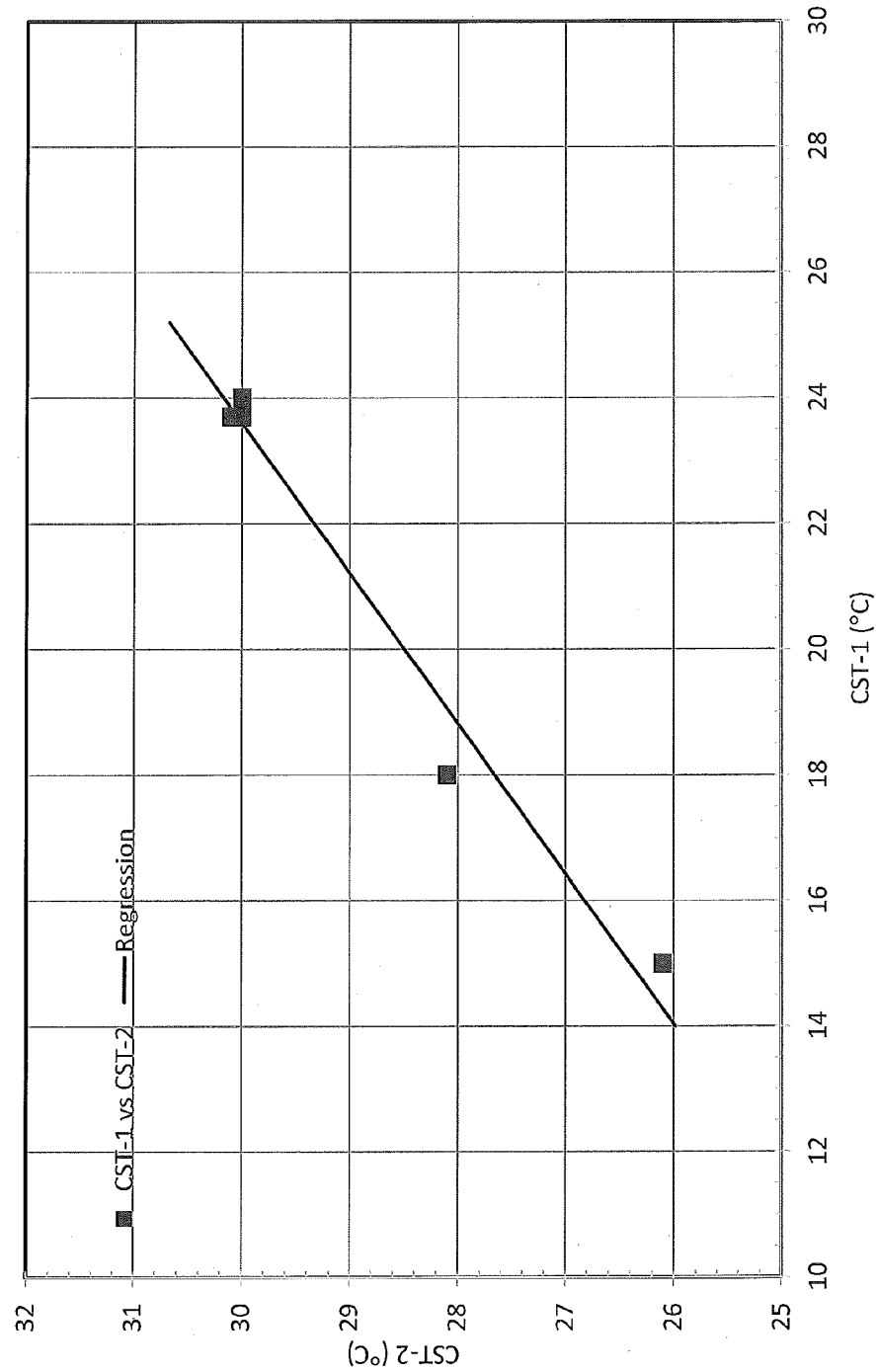
FIG. 5: Catalyst Solution Temperatures, CST-1 and CST-2.

The results of these experiments, i.e. ethylene interpolymer Examples 51-55, are summarized in Table 2. Table 2 shows that Whiteness Index (WI) improves (increases) and Yellowness Index (YI) improves (decreases) as catalyst solution temperatures CST-1 and CST-2 were reduced. FIGS. 3 and 4 illustrate the improvement in WI and YI, respectively, as CST-1 is reduced; FIG. 5 shows the correlation between CST-1 and CST-2, and; the linear regression relationships shown in FIGS. 3-5 are summarized below.

$$WI = 66.513 - 0.63759 \times CST\text{-}1\ r^2 = 0.9670$$

$$YI = -6.9743 + 0.22482 \times CST\text{-}1\ r^2 = 0.9288$$

$$CST\text{-}2 = 20.117 + 0.41873 \times CST\text{-}1\ r^2 = 0.9869$$

Table 3 shows that the WI and YI of ethylene interpolymer products can be improved by about 16% and 250%, respectively, by decreasing the catalyst solution temperatures CST-1 and CST-2, i.e. decreasing CST-1 from 26 to 13.5° C. and decreasing CST-2 from 31 to 25.8° C.

Table 4 shows that the color (both WI and YI) of Examples 51-55 improve as catalyst residues increase, e.g. Example 51 containing 5.9 ppm of titanium has a WI of 51 and a YI of −1.6; in contrast, Example 55 containing 7.1 ppm of titanium has a WI of 57 (improved) and a YI of −3.5 (improved). This trend of ethylene interpolymer products having improved color with increasing catalyst residues is contrary to what one of ordinary experience in the art would expect. For example, U.S. Pat. No. 3,773,743 discloses a process to improve the color of Ziegler-Natta polymers by removing catalyst residues, where TiCl$_4$ was used as the catalytic metal. As another example: *"the formation of colored Ti$^{4+}$ (phenolic antioxidant) complexes are the primary cause of discoloration in Ziegler-Natty polyethylene"* (see Allen et al. Journal of Vinyl & Additive Technology (2009) 15(4):234-243).

Table 4 also compares the Whiteness Index (WI) and Yellowness Index (YI) of Examples 51-55 to Comparative Examples H and E; in this disclosure Comparative Examples H and E are also called comparative "polyethylene compositions". Comparative Examples H and E are commercially available ethylene/1-octene copolymers produced by The Dow Chemical Company (Midland, Mich., USA); specifically, Elite 5100G and Elite 5500G, respectively. Comparative Examples H and E were produced in a solution polymerization process employing a single site catalyst formulation in reactor 1 and a batch Ziegler-Natta catalyst in reactor 2; where the two reactors are configured in series. Table 4 of this disclosure shows that Examples 51-55 have significantly improved color, both WI and YI, relative to Comparative Examples H and E. Examples 51-55 have an average WI of 53.2 which is 64% improved relative to the average WI of 32.5 for Comparative Examples H and E. Similarly, Examples 51-55 have an average YI of −2.28 which is 149% improved relative to the average YI of 4.7 for Comparative Examples H and E. Further, Examples 51-55 having an average titanium content of 6.6 ppm have improved color relative to Comparative Examples H and E having an average titanium content of 1.8 ppm; again, this trend of ethylene interpolymer products having improved color as well as higher catalyst residues is contrary to what one of ordinary experience in the art would expect.

A series of experiments were carried out where ethylene interpolymer products were produced as the catalyst deactivator mole ratio was varied. The catalyst deactivator mole ratio was defined as follows: (moles catalyst deactivator)/(total moles catalytic metal+total moles aluminum alkyl+total moles alkyl aluminum co-catalyst). In this disclosure the catalyst deactivator used was octanoic acid (caprylic acid); commercially available from P&G Chemicals, Cincinnati, Ohio, U.S.A. As shown in Table 5A, ethylene interpolymer products (Examples 41-44) were produced as the catalyst deactivator mole ratio was varied from 0.04 to 0.82; while attempting to keep all other solution process parameters constant. Additional solution process parameters for Examples 41-44 are shown in Tables 5B and 5C.

Figure 6:
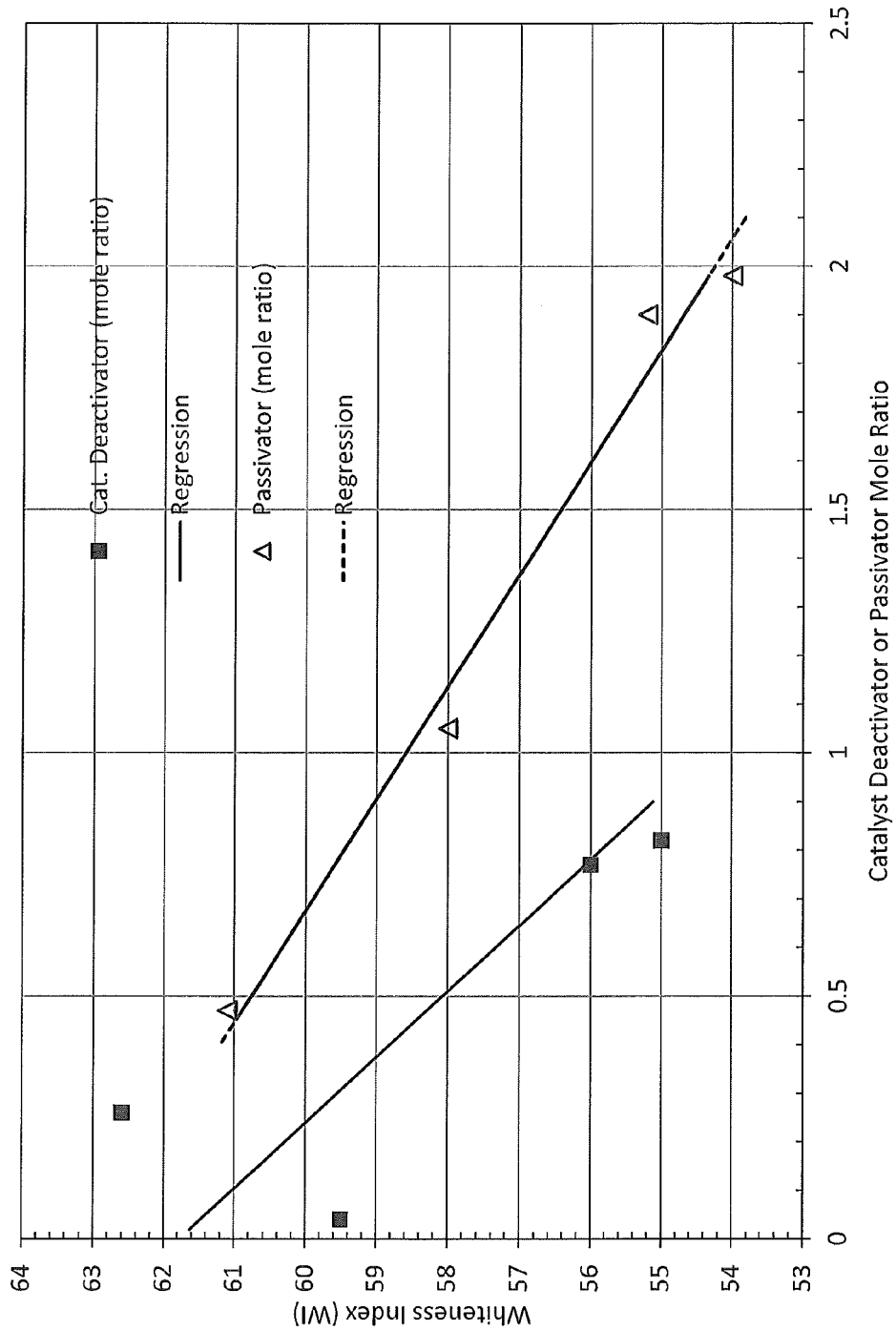
FIG. 6: Whiteness Index (WI) of ethylene interpolymer product as a function of the catalyst deactivator mole ratio and the passivator mole ratio.
Figure 7:
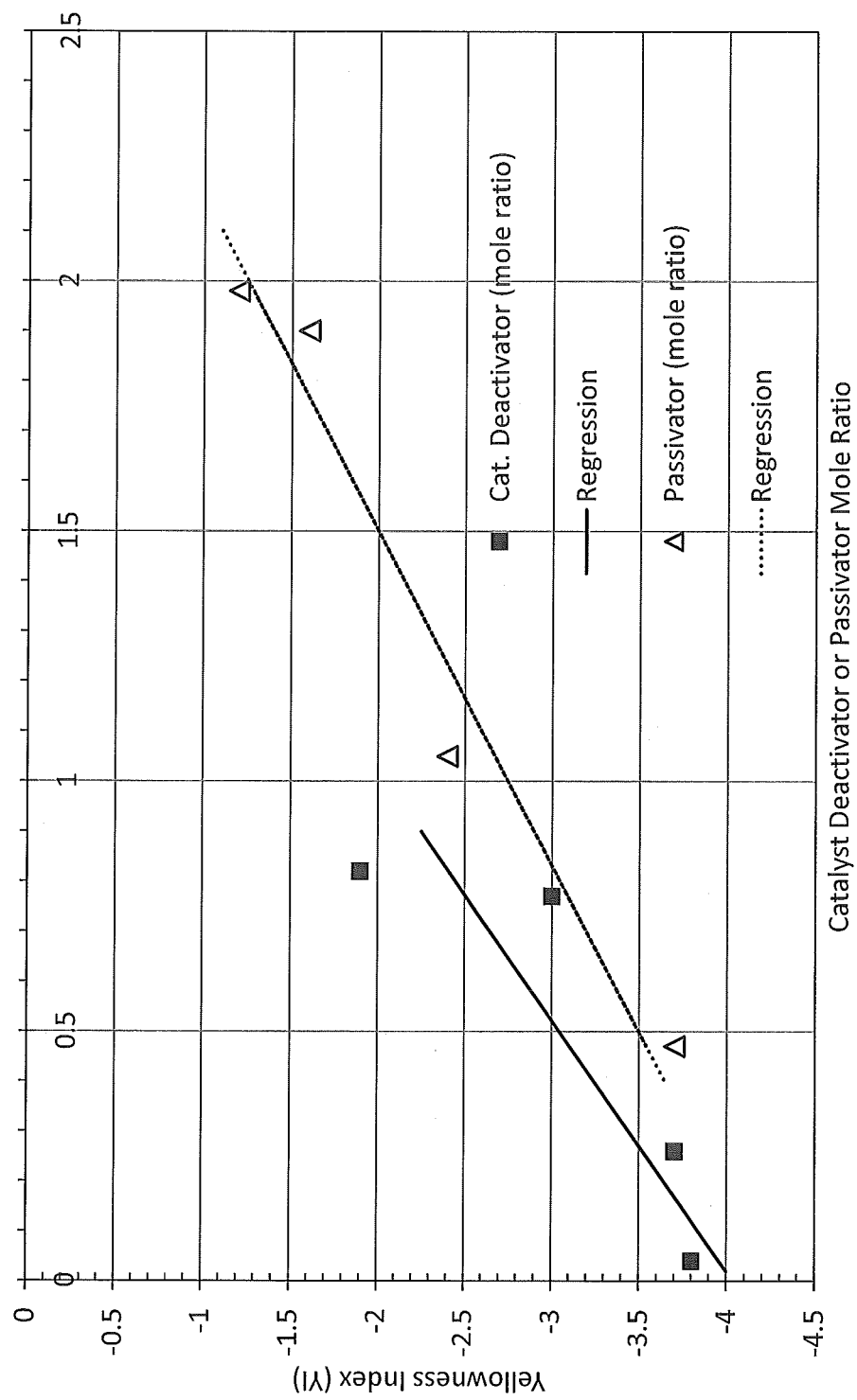
FIG. 7: Yellowness Index (YI) of ethylene interpolymer product as a function of the catalyst deactivator mole ratio and the passivator mole ratio.

Table 6 shows that the color of ethylene interpolymer products improve, both WI and YI, as the catalyst deactivator mole ratio decreases. This trend of improving WI and YI with decreasing catalyst deactivator mole ratio is also shown in FIGS. 6 and 7; the linear regression relationships shown in FIGS. 6 and 7 are summarized below.

$$WI = 61.768 - 7.3928 \times [\text{Cat. Deactivator Mole Ratio}]$$
$$r^2 = 0.6682$$

$$YI = -4.03863 + 1.9865 \times [\text{Cat. Deactivator Mole Ratio}]$$
$$r^2 = 0.7575$$

Based on these regression relationships, WI increased (improved) 12% as the deactivator mole ratio was reduced from 0.9 to 0.036; similarly, YI was reduced (improved) by 76%.

A series of experiments were carried out where ethylene interpolymer products were produced as the solution passivator mole ratio was varied. The passivator mole ratio was defined as follows: (moles passivator)/(total moles chloride); in this disclosure the source of chlorides were titanium tetrachloride and tertiary butyl chloride. As shown in Table 7A, ethylene interpolymer products (Examples 31-34) were produced as the passivator mole ratio was varied from 0.47 to 1.98; while attempting to keep all other solution process parameters constant. Additional solution process parameters for Examples 31-34 are shown in Tables 7B and 7C.

Table 8 shows that the color of ethylene interpolymer products improve (both WI and YI) as the passivator mole ratio decreases. This trend of improving WI and YI with decreasing passivator mole ratio is also shown in FIGS. 6 and 7; the linear regression relationships shown in FIGS. 6 and 7 are summarized below.

$$WI = 62.9350 - 4.3407 \times [\text{Passivator Mole Ratio}]$$
$$r^2 = 0.9813$$

$$YI = -4.2451 + 1.4964 \times [\text{Passivator Mole Ratio}]$$
$$r^2 = 0.9600$$

Based on regression relationships, WI increased (improved) 15% as the passivator mole ratio was reduced from 2.2 to 0.42; similarly, YI was reduced (improved) by 280%.

Flexible Manufactured Articles

The ethylene interpolymer products disclosed herein having improved (higher) Whiteness Index (WI) and improved (lower) Yellowness Index (YI) may be converted into a wide variety of flexible manufactured articles. Non-limiting examples include monolayer or multilayer films, such films are well known to those of ordinary experienced in the art. Non-limiting examples of processes to prepare such films include blown film and cast film processes.

Depending on the end-use application, the disclosed ethylene interpolymer products having improved color may be converted into films that span a wide range of thicknesses. Non-limiting examples include, food packaging films where thicknesses may range from about 0.5 mil (13 µm) to about 4 mil (102 µm), and; in heavy duty sack applications film thickness may range from about 2 mil (51 µm) to about 10 mil (254 µm).

Ethylene interpolymer products having improved color may be used in monolayer films; where the monolayer may contain more than one ethylene interpolymer product having improved color and/or additional thermoplastics; non-limiting examples of thermoplastics include ethylene polymers and propylene polymers. The lower limit on the weight percent of the ethylene interpolymer product having improved color in a monolayer film may be about 3 wt %, in other cases about 10 wt % and in still other cases about 30 wt %. The upper limit on the weight percent of the ethylene interpolymer product having improved color in the monolayer film may be 100 wt %, in other cases about 90 wt % and in still other cases about 70 wt %.

The ethylene interpolymer products having improved color disclosed herein may also be used in one or more layers of a multilayer film; non-limiting examples of multilayer films include three, five, seven, nine, eleven or more layers. The thickness of a specific layer (containing an ethylene interpolymer product having improved color) within a multilayer film may be about 5%, in other cases about 15% and in still other cases about 30% of the total multilayer film thickness. In other embodiments, the thickness of a specific layer (containing the ethylene interpolymer product having improved color) within a multilayer film may be about 95%, in other cases about 80% and in still other cases about 65% of the total multilayer film thickness. Each individual layer of a multilayer film may contain more than one ethylene interpolymer product having improved color and/or additional thermoplastics.

Additional embodiments include laminations and coatings, wherein mono or multilayer films containing the disclosed ethylene interpolymer products having improved color are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art.

There is a need to improve the color of articles manufactured from ethylene interpolymer. The color of a manufactured article is an important attribute; frequently color is often a customer's first impression of quality. It is essential that the color of a manufactured article meets the expectations of the customer. The ethylene interpolymer products having improved color disclosed herein can be used in a wide range of manufactured articles, e.g. articles that comprise one or more films (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g., sealant and/or toughness layers. Additional manufactured articles comprising one or more films containing at least one ethylene interpolymer product having improved color include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) comprising at least one embodiment of the disclosed ethylene interpolymer products having improved color.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), puncture-propagation tear resistance, tensile properties (yield strength, break strength, elongation at break, toughness, etc.) and heat sealing properties (heat seal initiation temperature and hot tack strength). Specific hot tack and heat sealing properties are desired in high speed vertical and horizontal form-fill-seal processes that load and seal a commercial product (liquid, solid, paste, part, etc.) inside a pouch-like package.

The films used in the manufactured articles described in this section may optionally include, depending on its intended use, additives and adjuvants. Non-limiting examples of additives and adjuvants include, anti-blocking agents, primary antioxidants, secondary antioxidants, heat stabilizers, slip agents, processing aids, anti-static additives, colorants, dyes, filler materials, light stabilizers, light absorbers, lubricants, pigments, plasticizers, nucleating agents and combinations thereof. Non-limiting examples of suitable primary antioxidants include Irganox 1010 [CAS Reg. No. 6683-19-8] and Irganox 1076 [CAS Reg. No. 2082-79-3]; both available from, BASF Corporation, Florham Park, N.J., U.S.A. Non-limiting examples of suitable secondary antioxidants include Irgafos 168 [CAS Reg. No. 31570-04-4], available from BASF Corporation, Florham Park, N.J., U.S.A.; Weston 705 [CAS Reg. No. 939402-02-5], available from Addivant, Danbury Conn., U.S.A. and; Doverphos Igp-11 [CAS Reg. No. 1227937-46-3] available form Dover Chemical Corporation, Dover Ohio, U.S.A.

Rigid Manufactured Articles

The ethylene interpolymer products disclosed herein having improved (higher) Whiteness Index (WI) and improved (lower) Yellowness Index (YI) may be converted into a wide variety of rigid manufactured articles. Non-limiting examples include: deli containers, margarine tubs, drink cups and produce trays; household and industrial containers, cups, bottles, pails, crates, tanks, drums, bumpers, lids, industrial bulk containers, industrial vessels, material handling containers, bottle cap liners, bottle caps, living hinge closures; toys, playground equipment, recreational equipment, boats, marine and safety equipment; wire and cable applications such as power cables, communication cables and conduits; flexible tubing and hoses; pipe applications including both pressure pipe and non-pressure pipe markets, e.g., natural gas distribution, water mains, interior plumbing, storm sewer, sanitary sewer, corrugated pipes and conduit; foamed articles manufactured from foamed sheet or bun foam; military packaging (equipment and ready meals); personal care packaging, diapers and sanitary products; cosmetic, pharmaceutical and medical packaging, and; truck bed liners, pallets and automotive dunnage. The rigid manufactured articles summarized in this paragraph contain one or more of the ethylene interpolymer products having improved color or a blend of at least one of the ethylene interpolymer products disclosed herein having improved color with at least one other thermoplastic.

Such rigid manufactured articles may be fabricated using the following non-limiting processes: injection molding, compression molding, blow molding, rotomolding, profile extrusion, pipe extrusion, sheet thermoforming and foaming processes employing chemical or physical blowing agents.

The desired physical properties of rigid manufactured articles depend on the application of interest. Non-limiting examples of desired properties include: flexural modulus (1% and 2% secant modulus); tensile toughness; environmental stress crack resistance (ESCR); slow crack growth resistance (PENT); abrasion resistance; shore hardness; deflection temperature under load; VICAT softening point; IZOD impact strength; ARM impact resistance; Charpy impact resistance, and; color (whiteness and/or yellowness index).

A further objective of the present disclosure is to provide rigid manufactured articles comprising ethylene interpolymer products having improved color that have improvements in at least one desirable physical property; relative to rigid manufactured articles formed from comparative ethylene interpolymers.

The rigid manufactured articles described in this section may optionally include, depending on its intended use, additives and adjuvants. Non-limiting examples of additives and adjuvants include, antioxidants, slip agents, processing aids, anti-static additives, colorants, dyes, filler materials, heat stabilizers, light stabilizers, light absorbers, lubricants, pigments, plasticizers, nucleating agents and combinations thereof.

Testing Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Ethylene interpolymer product densities were determined using ASTM D792-13 (Nov. 1, 2013).

Ethylene interpolymer product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

$$S.Ex.=\log(I_6/I_2)/\log(6480/2160)$$

wherein $I_6$ and $I_2$ are the melt flow rates measured at 190° C. using 6.48 kg and 2.16 kg loads, respectively.

Ethylene interpolymer product molecular weights, $M_n$, $M_w$ and $M_z$, as well the as the polydispersity ($M_w/M_n$), were determined using ASTM D6474-12 (Dec. 15, 2012). This method illuminates the molecular weight distributions of ethylene interpolymer products by high temperature gel permeation chromatography (GPC). The method uses commercially available polystyrene standards to calibrate the GPC.

The "Composition Distribution Branching Index" or "CDBI" of the disclosed Examples and Comparative Examples were determined using a crystal-TREF unit commercially available form Polymer ChAR (Valencia, Spain). The acronym "TREF" refers to Temperature Rising Elution Fractionation. A sample of ethylene interpolymer product (80 to 100 mg) was placed in the reactor of the Polymer ChAR crystal-TREF unit, the reactor was filled with 35 ml of 1,2,4-trichlorobenzene (TCB), heated to 150° C. and held at this temperature for 2 hours to dissolve the sample. An aliquot of the TCB solution (1.5 mL) was then loaded into the Polymer ChAR TREF column filled with stainless steel beads and the column was equilibrated for 45 minutes at 110° C. The ethylene interpolymer product was then crystallized from the TCB solution, in the TREF column, by slowly cooling the column from 110° C. to 30° C. using a cooling rate of 0.09° C. per minute. The TREF column was then equilibrated at 30° C. for 30 minutes. The crystallized ethylene interpolymer product was then eluted from the TREF column by passing pure TCB solvent through the column at a flow rate of 0.75 mL/minute as the temperature of the column was slowly increased from 30° C. to 120° C. using a heating rate of 0.25° C. per minute. Using Polymer ChAR software a TREF distribution curve was generated as the ethylene interpolymer product was eluted from the TREF column, i.e., a TREF distribution curve is a plot of the quantity (or intensity) of ethylene interpolymer eluting from the column as a function of TREF elution temperature. A $CDBI_{50}$ was calculated from the TREF distribution curve for each ethylene interpolymer product analyzed. The "$CDBI_{50}$" is defined as the percent of ethylene interpolymer whose composition is within 50% of the median comonomer composition (25% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e. the amount of comonomer in the ethylene interpolymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference.

Neutron Activation Analysis, hereafter N.A.A., was used to determine catalyst residues in ethylene interpolymers and was performed as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5 \times 10^{11}/cm^2/s$. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, Tenn., USA) and a multichannel analyzer (Ortec model DSPEC Pro). The amount of each element in the sample was calculated from the gamma-ray spectrum and recorded in parts per million relative to the total weight of the ethylene interpolymer sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/µg).

The Whiteness Index (WI) and Yellowness Index (YI) of ethylene interpolymer products, in pellet form, were measured according to ASTM E313-10 (approved in 2010) using a BYK Gardner Color-View colorimeter.

EXAMPLES

Polymerization

The following examples are presented for the purpose of illustrating selected embodiments of this disclosure; it being understood, that the examples presented do not limit the claims presented.

Embodiments of ethylene interpolymer product having improved Whiteness Index (WI) and improved Yellowness Index (YI) were produced in a continuous solution polymerization pilot plant comprising reactors arranged in a series configuration. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 4.8 gallons (18 L). Examples of ethylene interpolymer products were produced using an R1 pressure from about 14 MPa to about 18 MPa; R2 was operated at a lower pressure to facilitate continuous flow from R1 to R2. R1 and R2 were operated in series mode, wherein the first exit stream from R1 flows directly into R2. Both CSTR's were agitated to give conditions in which the reactor contents were well mixed. The process was operated continuously by feeding fresh process solvent, ethylene, 1-octene and hydrogen to the reactors.

The single site catalyst components used were: component (i), cyclopentadienyl tri(tertiary butyl)phosphinimine titanium dichloride, $(Cp[(t-Bu)_3PN]TiCl_2)$, hereafter PIC-1; component (ii), methylaluminoxane (MAO-07); component (iii), trityl tetrakis(pentafluoro-phenyl)borate, and; component (iv), 2,6-di-tert-butyl-4-ethylphenol. The single site catalyst component solvents used were methylpentane for components (ii) and (iv) and xylene for components (i) and (iii). The quantity of PIC-1 added to R1, "R1 (i) (ppm)" is shown in Table 1A; to be clear, in Example 51 in Table 1A, the solution in R1 contained 0.11 ppm of component (i), i.e., PIC-1. The mole ratios of the single site catalyst components employed to produce Example 51 were: R1 (ii)/(i) mole ratio=100.03, i.e. [(MAO-07)/(PIC-1)]; R1 (iv)/(ii) mole ratio=0.0, i.e. [(2,6-di-tert-butyl-4-ethylphenol)/(MAO-07)], and; R1 (iii)/(i) mole ratio=1.1, i.e., [(trityl tetrakis (pentafluoro-phenyl)borate)/(PIC-1)]. The single site catalyst formulation was injected into R1 using process solvent, the flow rate of this catalyst containing solvent was about 30 kg/hr, the temperature of this line (the first catalyst solution temperature, CST-1) was adjusted.

The in-line Ziegler-Natta catalyst formulation was prepared from the following components: component (v), butyl ethyl magnesium; component (vi), tertiary butyl chloride; component (vii), titanium tetrachloride; component (viii), diethyl aluminum ethoxide, and; component (ix), triethyl aluminum. Methylpentane was used as the catalyst component solvent. The in-line Ziegler-Natta catalyst formulation was prepared using the following steps. In step one, a solution of triethylaluminum and dibutylmagnesium ((triethylaluminum)/(dibutylmagnesium) molar ratio of 20) was combined with a solution of tertiary butyl chloride and allowed to react for about 30 seconds (HUT-1); in step two, a solution of titanium tetrachloride was added to the mixture formed in step one and allowed to react for about 14 seconds (HUT-2), and; in step three, the mixture formed in step two was allowed to reactor for an additional 3 seconds (HUT-3) prior to injection into R2. The in-line Ziegler-Natta procatalyst formulation was injected into R2 using process solvent, the flow rate of the catalyst containing solvent was about 49 kg/hr, the temperature of this line (the second catalyst solution temperature, CST-2) was adjusted. The in-line Ziegler-Natta catalyst formulation was formed in R2 by injecting a solution of diethyl aluminum ethoxide into R2. The quantity of titanium tetrachloride "R2 (vii) (ppm)" added to reactor 2 (R2) is shown in Table 1A; to be clear in Example 51 the solution in R2 contained 3.67 ppm of $TiCl_4$. The mole ratios of the in-line Ziegler-Natta catalyst components are also shown in Table 1A, specifically: R2 (vi)/(v) mole ratio, i.e., [(tertiary butyl chloride)/(butyl ethyl magnesium)]; R2 (viii)/(vii) mole ratio, i.e., [(diethyl aluminum ethoxide)/(titanium tetrachloride)], and; R2 (ix)/(vii) mole ratio, i.e., [(triethyl aluminum)/(titanium tetrachloride)]. To be clear, in Example 51, the following mole ratios were used to synthesize the in-line Ziegler-Natta catalyst: R2 (vi)/(v) mole ratio=2.07; R2 (viii)/(vii) mole ratio=1.35, and; R2 (ix)/(vii) mole ratio=0.35. Referring to FIG. 1, in all of the Examples disclosed, 100% of the diethyl aluminum ethoxide in stream 10d, component (viii), was added to reactor 12a via stream 10h.

In Comparative Example 2, a single site catalyst formulation was employed in both reactor 1 and reactor 2. Relative to Comparative Example 2, the maximum ethylene interpolymer product production rates (kg/h) of Examples 51-55, in which a single-site catalyst formulation was used in R1 and a heterogeneous catalyst formulation was used in R2, were at least 17.1% higher. For example, in Example 52 (single-site catalyst formulation in R1+in-line Ziegler-Natta catalyst formulation in R2) the ethylene interpolymer product was produced at a production rate of 94.4 kg/h; in contrast, in Comparative Example 2 (single-site catalyst formulation in both R1 and R2) the maximum production rate of the comparative ethylene interpolymer product was 80.6 kg/h.

Average residence time of the solvent in a reactor is primarily influenced by the amount of solvent flowing through each reactor and the total amount of solvent flowing through the solution process, the following are representative or typical values for the examples shown in Tables 1A-1C: average reactor residence times were: about 61 seconds in R1, about 73 seconds in R2 and about 50 seconds in R3 (the volume of R3 was about 4.8 gallons (18 L)).

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of titanium and aluminum added to the polymerization process; to be clear, the moles of octanoic acid added=0.5×(moles titanium+moles aluminum); this mole ratio was consistently used in all examples.

A two-stage devolitizing process was employed to recover the ethylene interpolymer product from the process solvent, i.e., two vapor/liquid separators were used and the second bottom stream (from the second V/L separator) was passed through a gear pump/pelletizer combination. DHT-4V (hydrotalcite), supplied by Kyowa Chemical Industry Co. LTD, Tokyo, Japan was used as a passivator, or acid scavenger, in the continuous solution process. A slurry of DHT-4V in process solvent was added prior to the first V/L separator. The molar amount of DHT-4V added was about 10-fold higher than the molar amount of chlorides added to the process; the chlorides added were titanium tetrachloride and tertiary butyl chloride.

Prior to pelletization the ethylene interpolymer product was stabilized by adding 500 ppm of Irganox 1076 (a primary antioxidant) and 500 ppm of Irgafos 168 (a secondary antioxidant), based on weight of the ethylene interpolymer product. Antioxidants were dissolved in process solvent and added between the first and second V/L separators.

In the case of Examples 51-55 and Comparative Example 2, Tables 1B and 1C disclose additional process parameters, e.g., ethylene and 1-octene splits between the reactors, reactor temperatures and ethylene conversions, etc. In Tables 1A-1C the targeted ethylene interpolymer product was 1.0 melt index ($I_2$) (ASTM D1239, 2.16 kg load, 190° C.) and 0.917 g/cm³ (ASTM D792). In Comparative Example 2, the single site catalyst formulation was injected into both reactor R1 and reactor R2, $ES^{R1}$ was 50% and $ES^{R2}$ was 50%. In Example 51, the single site catalyst formulation was injected into R1, the in-line Ziegler-Natta catalyst formulation was injected into R2, $ES^{R1}$ was 40% and $ES^{R2}$ was 60%.

Additional embodiments of ethylene interpolymer products having improved Whiteness Index (WI) and improved Yellowness Index (YI) are shown in Tables 5A-5C and Tables 7A-7C.

TABLE 1A

Continuous solution process catalyst parameters for Examples 51-55 and Comparative Example 2, targeting ethylene interpolymer products at 10 $I_2$ and 0.917 g/cm³.

| Sample Code | Example 51 | Example 52 | Example 53 | Example 54 | Example 55 | Comparative Example 2 |
|---|---|---|---|---|---|---|
| Cat Deactivator mole ratio[1] | 1.19 | 1.28 | 0.90 | 0.95 | 0.94 | 1.00 |
| Passivator Mole Ratio[2] | 1.23 | 1.34 | 0.92 | 1.41 | 1.26 | n/a |
| R1 Catalyst | PIC-1 | PIC-1 | PIC-1 | PIC-1 | PIC-1 | PIC-1 |
| R2 Catalyst | ZN | ZN | ZN | ZN | ZN | PIC-1 |
| R1 (i) (ppm) | 0.11 | 0.12 | 0.12 | 0.10 | 0.11 | 0.10 |
| R1 (ii)/(i) mole ratio | 100.03 | 100.01 | 100.00 | 100.00 | 100.00 | 100.00 |
| R1 (iv)/(ii) mole ratio | 0.0 | 0.0 | 0.0 | 0.0 | 0.0 | 0.30 |
| R1 (iii)/(i) mole ratio | 1.1 | 1.1 | 1.1 | 1.1 | 1.1 | 1.2 |
| R2 (i) (ppm) | 0 | 0 | 0 | 0 | 0 | 0.22 |
| R2 (ii)/(i) mole ratio | 0 | 0 | 0 | 0 | 0 | 25 |
| R2 (iv)/(ii) mole ratio | 0 | 0 | 0 | 0 | 0 | 0.30 |
| R2 (iii)/(i) mole ratio | 0 | 0 | 0 | 0 | 0 | 127 |
| R2 (vii) (ppm) | 3.67 | 3.46 | 5.12 | 4.62 | 4.56 | 0 |
| R2 (vi)/(v) mole ratio | 2.07 | 2.06 | 2.05 | 2.03 | 2.03 | 0 |
| R2 (viii)/(vii) mole ratio | 1.35 | 1.36 | 1.35 | 1.35 | 1.35 | 0 |
| R2 (ix)/(vii) mole ratio | 0.35 | 0.35 | 0.35 | 0.35 | 0.35 | 0 |
| Prod. Rate (kg/h) | 94.6 | 94.4 | 98.5 | 97.2 | 97.2 | 80.6 |
| Increase in Prod. Rate (%) | 17.4[a] | 17.1 | 22.2 | 20.6 | 20.6 | |

[1]Catalyst Deactivator Mole Ratio = (moles caprylic acid)/(total moles Ti + total moles Al)
[2]Passivator Mole Ratio = (moles DHT-4V)/(total moles chlorides)
[a]For example: Increase in Prod. Rate (%) = 17.4% = 100(94.6 − 80.6)/80.6

TABLE 1B

Additional solution process parameters for Examples 51-55 and Comparative Example 2.

| Sample Code | Example 51 | Example 52 | Example 53 | Example 54 | Example 55 | Comparative Example 2 |
|---|---|---|---|---|---|---|
| R3 volume (L) | 18 | 18 | 18 | 18 | 18 | 18 |
| $ES^{R1}$ (%) | 40 | 40 | 44 | 40 | 40 | 50 |
| $ES^{R2}$ (%) | 60 | 60 | 56 | 60 | 60 | 50 |
| $ES^{R3}$ (%) | 0 | 0 | 0 | 0 | 0 | 0 |
| R1 ethylene concentration (wt %) | 10.3 | 10.3 | 10.3 | 10.3 | 10.3 | 9.8 |
| R2 ethylene concentration (wt %) | 15.6 | 16.2 | 15.9 | 15.3 | 15.3 | 12.6 |
| R3 ethylene concentration (wt %) | 15.6 | 16.2 | 15.9 | 15.3 | 15.3 | 12.6 |

TABLE 1B-continued

Additional solution process parameters for Examples 51-55 and Comparative Example 2.

| Sample Code | Example 51 | Example 52 | Example 53 | Example 54 | Example 55 | Comparative Example 2 |
|---|---|---|---|---|---|---|
| ((octene)/(ethylene)) in R1 (wt %) | 0.822 | 0.822 | 0.741 | 0.718 | 0.714 | 0.710 |
| $CS^{R1}$ (%) | 100 | 100 | 100 | 100 | 100 | 100 |
| $CS^{R2}$ (%) | 0 | 0 | 0 | 0 | 0 | 0 |
| $CS^{R3}$ (%) | 0 | 0 | 0 | 0 | 0 | 0 |
| $H_2^{R1}$ (ppm) | 0.2 | 0.2 | 0.2 | 0.4 | 0.2 | 0.4 |
| $H_2^{R2}$ (ppm) | 5.0 | 5.0 | 4.0 | 2.3 | 3.5 | 0.8 |
| $H_2^{R3}$ (ppm) | 0 | 0 | 0 | 0 | 0 | 0 |
| Prod. Rate (kg/h) | 94.6 | 94.4 | 98.5 | 97.2 | 97.2 | 80.6 |
| Increase in Prod. Rate (%) | 17.4[a] | 17.1 | 22.2 | 20.6 | 20.6 | |

[a] For example: Increase in Prod. Rate (%) = 17.4% = 100(94.6 − 80.6)/80.6

TABLE 1C

Additional solution process parameters for Examples 51-55 and Comparative Example 2.

| Sample Code | Example 51 | Example 52 | Example 53 | Example 54 | Example 55 | Comparative Example 2 |
|---|---|---|---|---|---|---|
| R1 total solution rate (kg/h) | 371.5 | 379.2 | 410.1 | 359.0 | 359.0 | 385.7 |
| R2 total solution rate (kg/h) | 228.5 | 220.8 | 189.9 | 241.0 | 241.0 | 214.3 |
| R3 solution rate (kg/h) | 0 | 0 | 0 | 0 | 0 | 0 |
| Overall total solution rate (kg/h) | 600.0 | 600.0 | 600.0 | 599.9 | 599.8 | 600.0 |
| R1 inlet temp (° C.) | 30.1 | 30.1 | 30.0 | 30.0 | 30.0 | 30.0 |
| CST-1 (° C.) | 23.7 | 23.7 | 24.0 | 18.0 | 15.0 | 18.9 |
| R1 Mean temp (° C.) | 140.7 | 140.9 | 140.4 | 140.6 | 140.8 | 140.0 |
| R1 link line temp (° C.) | 133.5 | 133.4 | 135.3 | 124.0 | 124.9 | 142.5 |
| R2 inlet temp (° C.) | 30.0 | 30.0 | 30.0 | 30.0 | 30.0 | 30.0 |
| CST-2 (° C.) | 30.0 | 30.1 | 30.0 | 28.1 | 26.1 | 30.0 |
| R2 Mean temp (° C.) | 203.8 | 203.8 | 212.7 | 205.4 | 205.4 | 188.0 |
| R3 inlet temp (° C.) | 130 | 130 | 130 | 130 | 130 | 130 |
| R3 exit temp (actual) (° C.) | 213.2 | 213.3 | 218.7 | 213.4 | 213.3 | 195.0 |
| R3 exit temp (calc) (° C.) | 215.6 | 215.8 | 221.9 | 219.6 | 219.6 | 193.0 |
| $Q^{R1}$ (%) | 78.4 | 78.3 | 78.2 | 78.2 | 78.2 | 81.6 |
| $Q^{R2}$ (%) | 74.9 | 72.3 | 80.0 | 80.0 | 80.0 | 83.9 |
| $Q^{R2+R3}$ (%) | 85.1 | 82.4 | 88.8 | 92.6 | 92.7 | 92.6 |
| $Q^{R3}$ (%) | 40.8 | 36.6 | 44.0 | 63.2 | 63.4 | 54.0 |
| $Q^T$ (%) | 89.8 | 87.9 | 92.7 | 94.9 | 95.0 | 85.6 |
| Prod. Rate (kg/h) | 94.6 | 94.4 | 98.5 | 97.2 | 97.2 | 80.6 |
| Increase in Prod. Rate (%) | 17.4[a] | 17.1 | 22.2 | 20.6 | 20.6 | |

[a] For example: Increase in Prod. Rate (%) = 17.4% = 100(94.6 − 80.6)/80.6

TABLE 2

Density, melt index and color of Examples 51-55.

| Sample Code | Density (g/cm³) | $I_2$ (dg/min) | Color WI | Color YI | Temperature (° C.) CST-1 | Temperature (° C.) R1 Link Line | Temperature (° C.) CST-2 |
|---|---|---|---|---|---|---|---|
| Example 51 | 0.9165 | 1.03 | 51 | −1.6 | 23.7 | 133.5 | 30.0 |
| Example 52 | 0.9169 | 0.82 | 51 | −1.3 | 23.7 | 133.4 | 30.1 |
| Example 53 | 0.9164 | 0.92 | 52 | −1.9 | 24.0 | 135.3 | 30.0 |
| Example 54 | 0.9176 | 0.95 | 55 | −3.1 | 18.0 | 124.0 | 28.1 |
| Example 55 | 0.9170 | 0.92 | 57 | −3.5 | 15.0 | 124.9 | 26.1 |

TABLE 3

Percent improvement in the Whiteness Index (WI) and Yellowness Index (YI) of ethylene interpolymer products as Catalyst Solution Temperatures CST-1 and CST-2 are adjusted.

| | Ethylene Interpolymer Product Color | | | | |
|---|---|---|---|---|---|
| Adjusted CST-1 (° C.) | Whiteness Index (WI)[1] | % Improved Whiteness Index (WI)[2] | Yellowness Index (YI)[3] | % Improved Yellowness Index (YI)[4] | Adjusted CST-2 (° C.)[5] |
| 26.0 | 49.9 | 0.0 | −1.13 | 0.0 | 31.0 |
| 25.7 | 50.1 | 0.4 | −1.20 | 6.0 | 30.9 |
| 24.0 | 51.2 | 2.6 | −1.58 | 40 | 30.2 |
| 22.0 | 52.5 | 5.1 | −2.03 | 80 | 29.3 |
| 20.0 | 53.8 | 7.7 | −2.48 | 120 | 28.5 |
| 18.0 | 55.0 | 10 | −2.93 | 160 | 27.7 |
| 16.0 | 56.3 | 13 | −3.38 | 200 | 26.8 |

TABLE 3-continued

Percent improvement in the Whiteness Index (WI) and Yellowness Index (YI) of ethylene interpolymer products as Catalyst Solution Temperatures CST-1 and CST-2 are adjusted.

Ethylene Interpolymer Product Color

| Adjusted CST-1 (° C.) | Whiteness Index (WI)[1] | % Improved Whiteness Index (WI)[2] | Yellow-ness Index (YI)[3] | % Improved Yellowness Index (YI)[4] | Adjusted CST-2 (° C.)[5] |
|---|---|---|---|---|---|
| 14.0 | 57.6 | 15 | −3.83 | 240 | 26.0 |
| 13.5 | 57.9 | 16 | −3.94 | 250 | 25.8 |

[1] Form FIG. 1 regression line
[2] % Improvement in WI, relative to WI at CST-1 of 26° C. and CST-2 of 31° C.
[3] From FIG. 2 regression line
[4] % Improvement in YI, relative to YI value at CST-1 of 26° C. and CST-2 of 31° C.
[5] From FIG. 3 regression line

TABLE 4

Color and catalyst residues in Examples 51-55 and Comparative H and E.

| Sample Code | Density (g/cm$^3$) | $I_2$ (dg/min) | WI | YI | Ti (ppm) | Mg (ppm) | Cl (ppm) | Al (ppm) |
|---|---|---|---|---|---|---|---|---|
| Example 51 | 0.9165 | 1.01 | 51 | −1.6 | 5.9 | 199 | 78 | 99 |
| Example 52 | 0.9169 | 0.85 | 51 | −1.3 | 5.2 | 207 | 73 | 106 |
| Example 53 | 0.9164 | 0.90 | 52 | −1.9 | 7.3 | 229 | 104 | 112 |
| Example 54 | 0.9176 | 0.94 | 55 | −3.1 | 7.5 | 347 | 101 | 167 |
| Example 55 | 0.9170 | 0.91 | 57 | −3.5 | 7.1 | 295 | 100 | 146 |
| Comparative H | 0.920 | 0.85 | 31 | 5.2 | 2.2 | 15 | 49 | 11 |
| Comparative E | 0.914 | 1.00 | 34 | 4.2 | 1.3 | 9.8 | 32 | 6.8 |

TABLE 5A

Continuous solution process catalyst parameters for Examples 41-44, targeting ethylene interpolymer products at 1.0 $I_2$ and 0.917 g/cm$^3$.

| Sample Code | Example 41 | Example 42 | Example 43 | Example 44 |
|---|---|---|---|---|
| Cat Deactivator mole ratio[1] | 0.77 | 0.26 | 0.04 | 0.82 |
| Passivator Mole Ratio[2] | 0.94 | 1.00 | 0.92 | 1.01 |
| R1 Catalyst | PIC-1 | PIC-1 | PIC-1 | PIC-1 |
| R2 Catalyst | ZN | ZN | ZN | ZN |
| R1 (i) (ppm) | 0.09 | 0.09 | 0.08 | 0.10 |
| R1 (ii)/(i) mole ratio | 100.0 | 100.0 | 100.0 | 100.0 |
| R1 (iv)/(ii) mole ratio | 0 | 0 | 0 | 0 |
| R1 (iii)/(i) mole ratio | 1.4 | 1.4 | 1.4 | 1.4 |
| R2 (i) (ppm) | 0 | 0 | 0 | 0 |
| R2 (ii)/(i) mole ratio | 0 | 0 | 0 | 0 |
| R2 (iv)/(ii) mole ratio | 0 | 0 | 0 | 0 |
| R2 (iii)/(i) mole ratio | 0 | 0 | 0 | 0 |
| R2 (vii) (ppm) | 5.29 | 5.23 | 5.49 | 4.97 |
| R2 (vi)/(v) mole ratio | 1.75 | 1.75 | 1.75 | 1.75 |
| R2 (viii)/(vii) mole ratio | 1.35 | 1.34 | 1.35 | 1.35 |
| R2 (ix)/(vii) mole ratio | 0.35 | 0.35 | 0.35 | 0.35 |
| Prod. Rate (kg/h) | 101.5 | 101.5 | 101.5 | 101.5 |

[1] Catalyst Deactivator Mole Ratio = (moles caprylic acid)/(total moles Ti + total moles Al)
[2] Passivator Mole Ratio = (moles DHT-4V)/(total moles chloride)

TABLE 5B

Additional solution process parameters for Examples 41-44.

| Sample Code | Example 41 | Example 42 | Example 43 | Example 44 |
|---|---|---|---|---|
| R3 volume (L) | 18 | 18 | 18 | 18 |
| ES$^{R1}$ (%) | 40 | 40 | 40 | 40 |
| ES$^{R2}$ (%) | 60 | 60 | 60 | 60 |
| ES$^{R3}$ (%) | 0 | 0 | 0 | 0 |
| R1 ethylene concentration (wt %) | 10.3 | 10.3 | 10.3 | 10.3 |
| R2 ethylene concentration (wt %) | 16.5 | 16.5 | 16.5 | 16.5 |
| R3 ethylene concentration (wt %) | 16.5 | 16.5 | 16.5 | 16.5 |
| ((octene)/(ethylene)) in R1 (wt %) | 0.59 | 0.59 | 0.59 | 0.59 |
| CS$^{R1}$ (%) | 100 | 100 | 100 | 100 |
| CS$^{R2}$ (%) | 0 | 0 | 0 | 0 |
| CS$^{R3}$ (%) | 0 | 0 | 0 | 0 |
| H$_2^{R1}$ (ppm) | 1.00 | 1.01 | 1.02 | 1.08 |
| H$_2^{R2}$ (ppm) | 1.00 | 0.98 | 1.02 | 1.00 |
| H$_2^{R3}$ (ppm) | 0 | 0 | 0 | 0 |
| Prod. Rate (kg/h) | 101.5 | 101.5 | 101.5 | 101.5 |

TABLE 5C

Additional solution process parameters for Examples 41-44.

| Sample Code | Example 41 | Example 42 | Example 43 | Example 44 |
|---|---|---|---|---|
| R1 total solution rate (kg/h) | 384.5 | 384.8 | 384.6 | 380.8 |
| R2 total solution rate (kg/h) | 215.5 | 215.6 | 215.6 | 219.2 |
| R3 solution rate (kg/h) | 0 | 0 | 0 | 0 |
| Overall total solution rate (kg/h) | 600.0 | 600.4 | 600.2 | 600.0 |
| R1 inlet temp (° C.) | 30.0 | 30.0 | 30.0 | 30.0 |
| CST-1 (° C.) | 22.2 | 21.6 | 21.1 | 22.8 |
| R1 Mean temp (° C.) | 140.3 | 140.6 | 140.7 | 140.4 |
| R1 link line temp (° C.) | 143.6 | 142.8 | 142.7 | 143.8 |
| R2 inlet temp (° C.) | 30.1 | 30.1 | 29.9 | 30.1 |
| CST-2 (° C.) | 29.9 | 29.9 | 29.9 | 30.1 |
| R2 Mean temp (° C.) | 216.2 | 216.1 | 216.1 | 214.4 |
| R3 inlet temp (° C.) | 130 | 130 | 130 | 130 |
| R3 exit temp (actual) (° C.) | 221.0 | 220.9 | 221.7 | 219.1 |

TABLE 5C-continued

Additional solution process parameters for Examples 41-44.

| Sample Code | Example 41 | Example 42 | Example 43 | Example 44 |
|---|---|---|---|---|
| R3 exit temp (calc) (° C.) | 229.2 | 229.2 | 229.2 | 229.2 |
| $Q^{R1}$ (%) | 78.2 | 78.4 | 78.3 | 78.2 |
| $Q^{R2}$ (%) | 80.2 | 79.9 | 80.0 | 79.9 |
| $Q^{R2+R3}$ (%)[1] | n/a | n/a | n/a | n/a |
| $Q^{R3}$ (%)[1] | n/a | n/a | n/a | n/a |
| $Q^{T}$ (%)[1] | n/a | n/a | n/a | n/a |
| Prod. Rate (kg/h) | 101.5 | 101.5 | 101.5 | 100.4 |

[1]n/a = not available due to probe fouling

TABLE 6

Color of ethylene interpolymer products as a function of the catalyst deactivator mole ratio; see additional solution process parameters in Tables 4A-4C.

| Sample Code | Example 41 | Example 42 | Example 43 | Example 44 |
|---|---|---|---|---|
| Cat Deactivator mole ratio[1] | 0.77 | 0.26 | 0.04 | 0.82 |
| Passivator Mole Ratio[2] | 0.94 | 1.00 | 0.92 | 1.01 |
| CST-1 (° C.) | 22.2 | 21.6 | 21.1 | 22.8 |
| CST-2 (° C.) | 29.9 | 29.9 | 29.9 | 30.1 |
| Density (g/cm³) | 0.9178 | 0.9176 | 0.9174 | 0.9179 |
| $I_2$ (dg/min) | 0.93 | 0.99 | 1.08 | 0.93 |
| Stress Exponent | 1.23 | 1.23 | 1.23 | 1.23 |
| $I_{21}/I_2$ | 23.8 | 23.9 | 24.2 | 23.4 |
| Irganox 1076 (ppm) | 528 | 508 | 516 | 560 |
| Irgafos 168 (ppm) | 453 | 436 | 456 | 510 |
| Whiteness Index | 56 | 62.6 | 59.5 | 55 |
| Yellowness Index | −3.0 | −3.7 | −3.8 | −1.9 |

[1]Catalyst Deactivator Mole Ratio = (moles caprylic acid)/(total moles Ti + total moles Al)
[2]Passivator Mole Ratio = (moles DHT-4V)/(total moles chloride)

TABLE 7A

Continuous solution process catalyst parameters for Examples 31-34; targeting ethylene interpolymer products at 1.0 $I_2$ and 0.917 g/cm³.

| Sample Code | Example 31 | Example 32 | Example 33 | Example 34 |
|---|---|---|---|---|
| Cat Deactivator mole ratio[1] | 0.73 | 0.73 | 0.72 | 0.72 |
| Passivator Mole Ratio[2] | 1.05 | 0.47 | 1.90 | 1.98 |
| R1 Catalyst | PIC-1 | PIC-1 | PIC-1 | PIC-1 |
| R2 Catalyst | ZN | ZN | ZN | ZN |
| R1 (i) (ppm) | 0.09 | 0.09 | 0.08 | 0.09 |
| R1 (ii)/(i) mole ratio | 100.1 | 100.0 | 100.0 | 100.1 |
| R1 (iv)/(ii) mole ratio | 0 | 0 | 0 | 0 |
| R1 (iii)/(i) mole ratio | 1.2 | 1.2 | 1.2 | 1.2 |
| R2 (i) (ppm) | 0 | 0 | 0 | 0 |
| R2 (ii)/(i) mole ratio | 0 | 0 | 0 | 0 |
| R2 (iv)/(ii) mole ratio | 0 | 0 | 0 | 0 |
| R2 (iii)/(i) mole ratio | 0 | 0 | 0 | 0 |
| R2 (vii) (ppm) | 5.62 | 5.84 | 5.87 | 5.82 |
| R2 (vi)/(v) mole ratio | 1.75 | 1.75 | 1.75 | 1.75 |
| R2 (viii)/(vii) mole ratio | 1.35 | 1.34 | 1.35 | 1.35 |
| R2 (ix)/(vii) mole ratio | 0.35 | 0.35 | 0.35 | 0.35 |
| Prod. Rate (kg/h) | 101.3 | 101.3 | 101.3 | 101.3 |

[1]Catalyst Deactivator Mole Ratio = (moles caprylic acid)/(total moles Ti + total moles Al)
[2]Passivator Mole Ratio = (moles DHT-4V)/(total moles chloride)

TABLE 7B

Additional solution process parameters for Examples 31-34.

| Sample Code | Example 31 | Example 32 | Example 33 | Example 34 |
|---|---|---|---|---|
| R3 volume (L) | 18 | 18 | 18 | 18 |
| $ES^{R1}$ (%) | 40 | 40 | 40 | 40 |
| $ES^{R2}$ (%) | 60 | 60 | 60 | 60 |
| $ES^{R3}$ (%) | 0 | 0 | 0 | 0 |
| R1 ethylene concentration (wt %) | 10.3 | 10.3 | 10.3 | 10.3 |
| R2 ethylene concentration (wt %) | 16.5 | 16.5 | 16.5 | 16.5 |
| R3 ethylene concentration (wt %) | 16.5 | 16.5 | 16.5 | 16.5 |
| ((octene)/(ethylene)) in R1 (wt %) | 0.59 | 0.59 | 0.59 | 0.59 |
| $CS^{R1}$ (%) | 100 | 100 | 100 | 100 |
| $CS^{R2}$ (%) | 0 | 0 | 0 | 0 |
| $CS^{R3}$ (%) | 0 | 0 | 0 | 0 |
| $H_2^{R1}$ (ppm) | 0.99 | 1.01 | 1.01 | 0.99 |
| $H_2^{R2}$ (ppm) | 1.00 | 0.98 | 1.02 | 1.02 |
| $H_2^{R3}$ (ppm) | 0 | 0 | 0 | 0 |
| Prod. Rate (kg/h) | 101.3 | 101.3 | 101.3 | 101.3 |

TABLE 7C

Additional solution process parameters for Examples 31-34.

| Sample Code | Example 31 | Example 32 | Example 33 | Example 34 |
|---|---|---|---|---|
| R1 total solution rate (kg/h) | 384.4 | 384.6 | 384.6 | 384.3 |
| R2 total solution rate (kg/h) | 215.8 | 215.6 | 215.4 | 215.4 |
| R3 solution rate (kg/h) | 0 | 0 | 0 | 0 |
| Overall total solution rate (kg/h) | 600.2 | 600.2 | 600.0 | 599.7 |
| R1 inlet temp (° C.) | 30.2 | 30.0 | 30.1 | 30.1 |
| CST-1 (° C.) | 21.8 | 21.6 | 21.0 | 21.0 |
| R1 Mean temp (° C.) | 140.3 | 140.4 | 140.4 | 140.5 |
| R2 inlet temp (° C.) | 30.0 | 29.9 | 30.0 | 29.9 |
| R1 link line temp (° C.) | 141.8 | 141.7 | 141.4 | 140.9 |
| CST-2 (° C.) | 29.6 | 29.8 | 29.9 | 30.0 |
| R2 Mean temp (° C.) | 215.6 | 216.2 | 215.8 | 216.2 |
| R3 inlet temp (° C.) | 130 | 130 | 130 | 130 |
| R3 exit temp (actual) (° C.) | 218.6 | 219.3 | 218.5 | 218.6 |
| R3 exit temp (calc) (° C.) | 228.8 | 228.8 | 228.8 | 228.8 |
| $Q^{R1}$ (%) | 78.7 | 78.3 | 78.3 | 78.6 |
| $Q^{R2}$ (%) | 80.0 | 80.2 | 79.6 | 80.2 |
| $Q^{R2+R3}$ (%)[1] | n/a | n/a | n/a | n/a |
| $Q^{R3}$ (%)[1] | n/a | n/a | n/a | n/a |
| $Q^{T}$ (%)[1] | n/a | n/a | n/a | n/a |
| Prod. Rate (kg/h) | 101.3 | 101.3 | 101.3 | 101.3 |

[1]n/a = not available due to probe fouling

TABLE 8

Color of ethylene interpolymer products as a function of the passivator mole ratio; see additional solution process data is shown in Tables 4A to 4C.

| Sample Code | Example 31 | Example 32 | Example 33 | Example 34 |
|---|---|---|---|---|
| Cat Deactivator mole ratio[1] | 0.73 | 0.73 | 0.72 | 0.72 |
| Passivator Mole Ratio[2] | 1.05 | 0.47 | 1.90 | 1.98 |
| CST-1 (° C.) | 21.8 | 21.6 | 21.0 | 21.0 |
| CST-2 (° C.) | 29.6 | 29.8 | 29.9 | 30.0 |
| Density (g/cm³) | 0.9183 | 0.9177 | 0.9175 | 0.9176 |

TABLE 8-continued

Color of ethylene interpolymer products as a function of the passivator mole ratio; see additional solution process data is shown in Tables 4A to 4C.

| Sample Code | Example 31 | Example 32 | Example 33 | Example 34 |
|---|---|---|---|---|
| $I_2$ (dg/min) | 0.87 | 0.95 | 0.97 | 0.94 |
| Stress Exponent | 1.24 | 1.23 | 1.24 | 1.24 |
| $I_{21}/I_2$ | 24.5 | 24.6 | 24.8 | 24.4 |
| Irganox 1076 (ppm) | 541 | 538 | 551 | 585 |
| Irgafos 168 (ppm) | 1073 | 1080 | 1104 | 1150 |
| Whiteness Index | 58 | 61.1 | 55.2 | 54 |
| Yellowness Index | −2.4 | −3.7 | −1.6 | −1.2 |

[1] Catalyst Deactivator Mole Ratio = (moles caprylic acid)/(total moles Ti + total moles Al)
[2] Passivator Mole Ratio = (moles DHT-4V)/(total chlorides)

TABLE 9

A computer generated simulation of the ethylene interpolymer products disclosed herein. Computer generated Simulated Example 13 was produced using a single-site catalyst formulation in R1 (PIC-1) and an in-line Ziegler-Natta catalyst formulation in R2; R3 4.8 gallons (18 L); production rate 90.9 kg/hr, and; R3 outlet temperature 217.1° C.

| Simulated Physical Property | Reactor 1 (R1) First Ethylene Interpolymer | Reactor 2 (R2) Second Ethylene Interpolymer | Reactor 3 (R3) Third Ethylene Interpolymer | Simulated Example 13 |
|---|---|---|---|---|
| Weight Percent (%) | 36.2 | 56.3 | 7.5 | 100 |
| $M_n$ | 63806 | 25653 | 20520 | 31963 |
| $M_w$ | 129354 | 84516 | 67281 | 99434 |
| $M_z$ | 195677 | 198218 | 162400 | 195074 |
| Polydispersity ($M_w/M_n$) | 2.03 | 3.29 | 3.28 | 3.11 |
| Branch Frequency ($C_6$ Branches per 1000 C) | 12.6 | 11.4 | 15.6 | 12.1 |
| $CDBI_{50}$ (%) (range) | 90 to 95 | 55 to 60 | 45 to 55 | 65 to 70 |
| Density (g/cm$^3$) | 0.9087 | 0.9206 | 0.9154 | 0.9169 |
| Melt Index (dg/min) | 0.31 | 1.92 | 4.7 | 1.0 |

What is claimed is:

1. A continuous solution polymerization process to provide an ethylene interpolymer product having improved color comprising:
   i) selecting a desired color index value;
   ii) preparing a single site catalyst formulation in a first catalyst solution having a first catalyst solution temperature (CST-1);
   iii) adjusting said CST-1;
   iv) injecting said first catalyst solution, ethylene, a process solvent, optionally one or more α-olefins and optionally hydrogen into a first reactor to produce a first exit stream containing a first ethylene interpolymer in said process solvent;
   v) preparing a first heterogeneous catalyst formulation in a second catalyst solution having a second catalyst solution temperature (CST-2);
   vi) adjusting said CST-2;
   vii) passing said first exit stream into a second reactor and injecting into said second reactor, said second catalyst solution, ethylene, said process solvent, optionally one or more α-olefins and optionally hydrogen to produce a second exit stream containing a second ethylene interpolymer and said first ethylene interpolymer in said process solvent;
   viii) optionally preparing a second heterogeneous catalyst formulation in a third catalyst solution having a third catalyst solution temperature (CST-3);
   ix) optionally adjusting said CST-3;
   x) passing said second exit stream into a third reactor and optionally injecting into said third reactor, said third catalyst solution, ethylene, said process solvent, one or more α-olefins and hydrogen to produce a third exit stream containing an optional third ethylene interpolymer, said second ethylene interpolymer and said first ethylene interpolymer in said process solvent;
   xi) phase separating said third exit stream to recover said ethylene interpolymer product comprising said first ethylene interpolymer, said second ethylene interpolymer and optionally said third ethylene interpolymer, and;
   xii) measuring an observed color index value of said ethylene interpolymer product and adjusting CST-1 and CST-2 and optionally CST-3 to attain said desired color index value.

2. The process of claim 1; wherein said desired color index value is a Yellowness Index (YI).

3. The process of claim 2; wherein said CST-1 is adjusted between about 30° C. and about 10° C. and said CST-2 is adjusted between about 35° C. and about 20° C. producing said ethylene interpolymer product having said Yellowness Index (YI) decreased from about 5% to about 250%.

4. The process of claim 1; wherein said desired color index value is a Whiteness Index (WI).

5. The process of claim 4; wherein said CST-1 is adjusted between about 30° C. and about 10° C. and said CST-2 is adjusted between about 35° C. and about 20° C. producing said ethylene interpolymer product having said Whiteness Index (WI) increased from about 5% to 20%.

6. The process of claim 1 further comprising:
   a) optionally adding a catalyst deactivator A to said second exit stream, downstream of said second reactor, forming a deactivated solution A;
   b) adding a catalyst deactivator B to said third exit stream, downstream of said third reactor, forming a deactivated solution B; with the proviso that step b) is skipped if said catalyst deactivator A is added in step a), and;
   c) phase separating said deactivated solution A or B to recover said ethylene interpolymer product.

7. The process of claim 6 further comprising:
   a) adding a passivator to said deactivated solution A or B forming a passivated solution, and;
   b) phase separating said passivated solution to recover said ethylene interpolymer product.

8. The process of claim 1 wherein said first heterogeneous catalyst formulation is a first in-line Ziegler-Natta catalyst formulation or a first batch Ziegler-Natta catalyst formulation, and; optionally said second heterogeneous catalyst formulation is a second in-line Ziegler-Natta catalyst formulation or a second batch Ziegler-Natta catalyst formulation.

9. The process of claim 1 wherein said first, second and third reactors operate at a temperature from about 80° C. to about 300° C. and a pressure from about 3 MPag to about 45 MPag.

10. The process of claim 1 wherein said optional one or more α-olefins are $C_3$ to $C_{10}$ α-olefins.

11. The process of claim 1 wherein said optional α-olefin is 1-hexene, 1-octene or a mixture of 1-hexene and 1-octene.

12. The process according to claim 6 wherein said catalyst deactivator is a carboxylic acid, $RCO_2H$, wherein R is a linear or branched hydrocarbyl group having from 5 to 20 carbon atoms.

* * * * *